United States Patent
Carnell et al.

(10) Patent No.: US 12,505,386 B1
(45) Date of Patent: Dec. 23, 2025

(54) DETECTING AND REDUCING BIAS IN MACHINE LEARNING MODELS

(71) Applicant: THE HUNTINGTON NATIONAL BANK, Columbus, OH (US)

(72) Inventors: Robert Carnell, Columbus, OH (US); Daniel R. Tuthill, Columbus, OH (US); Jingyu Song, Columbus, OH (US); Xuelei Yuan, Columbus, OH (US)

(73) Assignee: The Huntington National Bank, Columbus, OH (US)

( * ) Notice: Subject to any disclaimer, the term of this patent is extended or adjusted under 35 U.S.C. 154(b) by 0 days.

(21) Appl. No.: 19/050,755

(22) Filed: Feb. 11, 2025

(51) Int. Cl.
*G06N 20/00* (2019.01)

(52) U.S. Cl.
CPC .................................. *G06N 20/00* (2019.01)

(58) Field of Classification Search
CPC .................................................... G06N 20/00
See application file for complete search history.

(56) References Cited

U.S. PATENT DOCUMENTS

| | | | |
|---|---|---|---|
| 2024/0378508 A1* | 11/2024 | Mukhopadhyay | G06N 20/00 |
| 2025/0021867 A1* | 1/2025 | Sun | G06N 20/10 |
| 2025/0021868 A1* | 1/2025 | Andrews | G06N 7/01 |
| 2025/0094862 A1* | 3/2025 | Pushak | G06N 20/00 |

* cited by examiner

Primary Examiner — Dave Misir
(74) Attorney, Agent, or Firm — Kilpatrick Townsend & Stockton LLP

(57) ABSTRACT

Techniques are described herein for verifying and/or reducing bias in machine learning (ML) models. An ML model may be trained using a baseline training data set (TDS). A second TDS may be generated from the baseline TDS based on executing a classification algorithm to assign each example to one of a set of classes. The class-aware ML models may be trained using class-specific examples (e.g., examples that correspond to a given class). Bias in the ML model may be detected based on providing an input to the ML model and each of the class-aware ML models and identifying differences between their respective outputs. If bias is detected, a parameter that highly correlates to the output of the ML model may be removed from the training data and the process may begin anew. Each iteration of the process may reduce the bias originally detected in the ML model.

20 Claims, 13 Drawing Sheets

| # | Name | Age | Address | Predicted/ Expected/Known Value(s) | Class Indicator |
|---|---|---|---|---|---|
| 1 | Zuri Stark | 32 | 9 Tanika View, Lake Malcomland, MT | 0.1 | 1 |
| 2 | Kristopher Cook | 24 | 5596 Yen Flat, East Iraport, NC | 0.2 | 2 |
| 3 | Aaliyah Nicholson | 79 | 9580 Janett, West Rashida, CA | 0.1 | 1 |
| 4 | Rodrigo Proctor | 44 | 521 Marvon Lane Caldwell, NJ | 0.2 | 1 |
| 5 | Chandler Rush | 18 | 37 Greenview Drive New Haven, NY | 0.2 | 3 |
| 6 | Kaiser Cook | 26 | 494 Walnutwood Ave. Neptune, NJ | 0.5 | 3 |
| 7 | Aaliyah Woodard | 27 | 611 Beechwood St. Apple Valley, CA | 0.7 | 1 |
| 8 | Westley Ball | 35 | 919 Fremont Street West Chester, PA | 0.4 | 2 |
| 9 | Abby Chen | 39 | 96 South Sage Street Miamisburg, OH | 0.2 | 1 |
| 10 | Emmanuel Sims | 37 | 34 1st Rd. Rockville Centre, NY | 0.1 | 1 |
| 11 | Lena Petersen | 54 | 340 South Jackson St. Clementon, NJ | 0.1 | 3 |
| 12 | Samson Webb | 95 | 365 Prairie Road Ocean Springs, MS | 0.6 | 2 |
| 13 | Ariella Scott | 18 | 7 Virginia Avenue Santa Cruz, CA | 0.3 | 2 |
| 14 | Leo Graham | 66 | 589 Pennington Street Norwalk, CT | 0.4 | 3 |
| 15 | Alaia Strickland | 31 | 46 South Brickell St. Hightstown, NJ | 0.4 | 3 |
| 16 | Keegan Randolph | 31 | 173 Manhattan Dr. Zionsville, IN | 0.9 | 3 |
| 17 | Kailey Stanton | 37 | 189 Shub Farm St. Belleville, NJ | 0.5 | 1 |
| 18 | Zyair Bruce | 58 | 85 Windfall St. Evanston, IL | 0.4 | 2 |
| 19 | Marilyn Daniel | 44 | 296 W. Oakwood Drive Langhorne, PA | 0.2 | 3 |
| 20 | Grady Barnett | 21 | 24 Railroad Drive Drexel Hill, PA | . | . |
| . | . | . | . | . | . |
| N | | | | | |

*FIG. 4*

DETECTING AND REDUCING BIAS IN MACHINE LEARNING MODELS

BACKGROUND

Machine learning models are often used in a variety of contexts. These models may include bias that produces significantly different output predictions for similar instances of input data (e.g., input data instances that are similar except for a difference in class status). Most research and discussion of some types of bias of machine learning models is based on binomial outputs. Research is lacking for addressing such bias in machine learning models with continuous outputs (e.g., non-binomial output). Further, regression-related research may not be easily generalizable to arbitrary machine learning contexts and, therefore, reducing such bias has been a tedious and manual process. It is beneficial to detect and reduce machine learning model bias to improve the overall accuracy of the machine learning model and of the utilizing system, as a whole.

TECHNICAL FIELD

This disclosure generally relates to verifying and/or reducing bias in machine learning models, and more particularly to systems, methods, and non-transitory, computer-readable media that may be used to identify parameters in training data that, if used, result in trained models that include biased outputs. By identifying and removing these parameters from training data, bias may be reduced or eliminated from a model trained from such data.

BRIEF SUMMARY OF THE INVENTION

Techniques are provided for detecting and/or correcting bias (e.g., a disparate impact on a protected class) in machine learning models. Various embodiments are described herein, including methods, systems, non-transitory computer-readable storage media storing programs, code, or instructions executable by one or more processors, and the like.

One embodiment is directed to a computer-implemented method (a "method") comprising training a baseline machine learning model using a regression algorithm and a baseline training data set. In some embodiments, the baseline training data set may comprise a plurality of examples. Each example of the baseline training data set may comprise one or more independent parameters and a corresponding set of dependent parameter continuous values. The method may comprise generating a second training data set from the baseline training data set. An example of the second training data set may be associated with a class of a set of classes. In some embodiments, the class may be determined based at least in part on executing a classification algorithm on a corresponding example of the baseline training data set. The method may comprise training a plurality of class-aware machine learning models. Each class-aware machine learning model may be trained using a subset of examples of the second training data set. The subset of examples may correspond to a respective class of the set of classes. The method may comprise providing an example of the baseline training data set as input to the baseline machine learning model and each of the class-aware machine learning models. The method may comprise determining a set of differences based at least in part on respective outputs of the class-aware machine learning models and the baseline machine learning model. The method may comprise performing one or more operations based at least in part on the set of differences. The one or more operations may be associated with verifying a lack of bias or reducing the bias of the baseline machine learning model.

In some embodiments, the method may comprise 1) providing an example of the baseline training data set to the classification algorithm as input data and 2) receiving output identifying a corresponding class of the set of classes for the input data.

In some embodiments, the method may comprise determining a probability distribution of class assignment of the set of classes identified by executing the classification algorithm.

In some embodiments, the method may comprise 1) identifying a sample data set of the baseline training data set based at least in part on performing a random sampling of the baseline training data set, and 2) assigning a respective class from the set of classes to each example of the sample data set, the respective class being assigned based at least in part on the probability distribution.

In some embodiments, the method may comprise retraining the plurality of class-aware machine learning models based at least in part on the sample data set.

In some embodiments, the method may comprise 1) generating a confidence interval based at least in part on a subset of differences of the set of differences (e.g., the subset of differences corresponding to a class-aware machine learning model), 2) determining that the confidence interval lacks a zero value, 3) identifying an amount of correlation corresponding to a parameter of the baseline training data set and an output provided by the baseline machine learning model, and 4) generating a modified training data set based at least in part on removing the parameter from the baseline training data set.

In some embodiments, the one or more operations may comprise generating a modified machine learning model based at least in part on retraining the baseline machine learning model with the modified training data set.

In some embodiments, a system comprises one or more processors and one or more memories storing computer-executable instructions that, when executed by the one or more processors, causes the one or more processors to perform the method(s) disclosed herein.

In some embodiments, a computing device comprises one or more processors and one or more memories storing computer-executable instructions that, when executed by the one or more processors, causes the one or more processors to perform the method(s) disclosed herein.

In some embodiments, a non-transitory computer-readable storage medium storing computer-executable instructions that, when executed with one or more processors of a computing device, causes the computing device to perform the method(s) disclosed herein.

BRIEF DESCRIPTION OF THE DRAWINGS

Various embodiments in accordance with the present disclosure will be described with reference to the drawings, in which:

FIG. 4 is a second simplified example data set for training machine learning models, in accordance with at least one embodiment;

DETAILED DESCRIPTION

Figure 1:
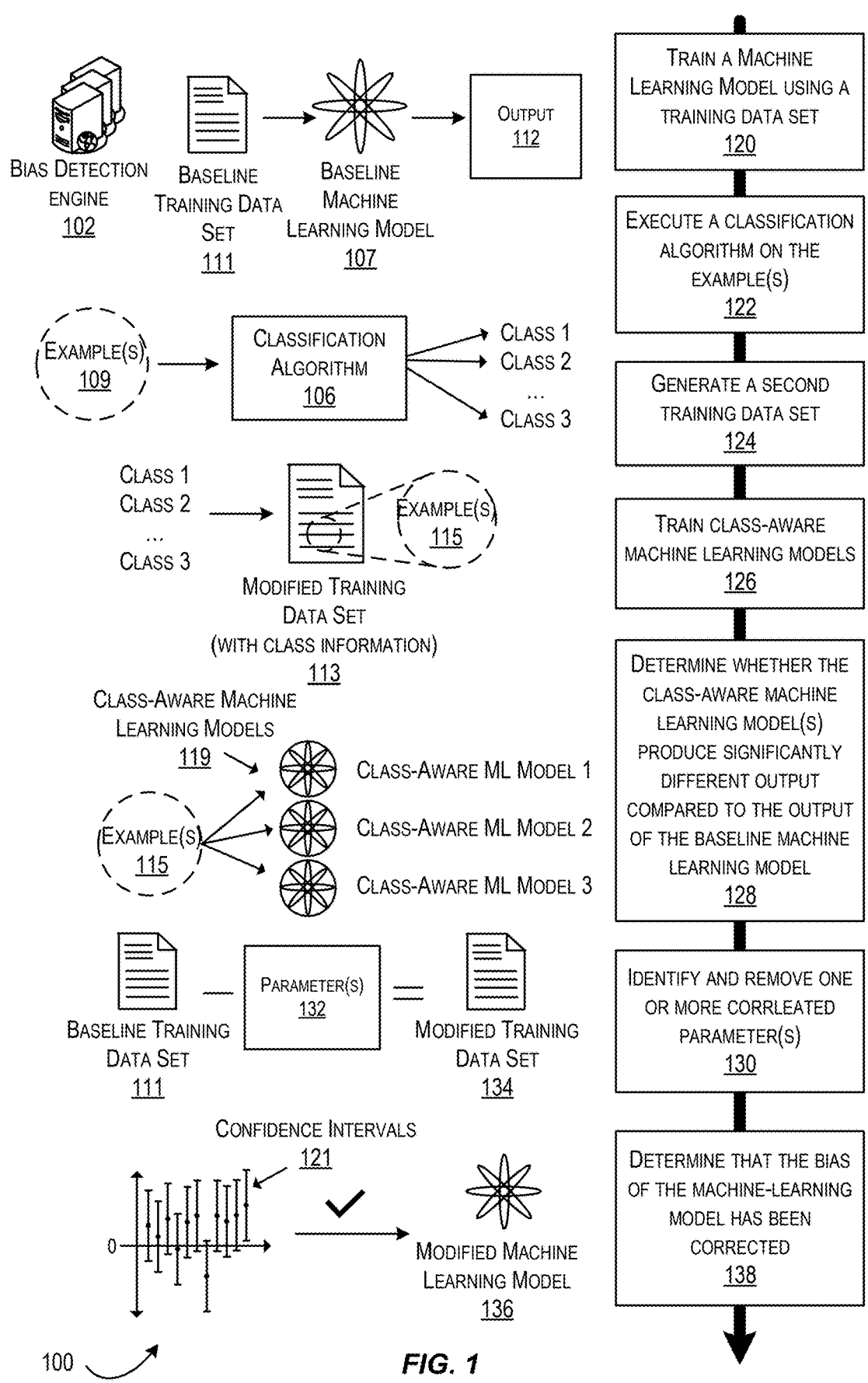
FIG. 1 is a simplified example flow for detecting and/or correcting bias in a machine learning model, in accordance with at least one embodiment.

In the following description, various embodiments will be described. For purposes of explanation, specific configurations and details are set forth in order to provide a thorough understanding of the embodiments. However, it will be apparent to one skilled in the art that the embodiments may be practiced without the specific details. Furthermore, well-known features may be omitted or simplified in order not to obscure the embodiment being described.

Some or all of the process (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

As machine learning models are created and evolve, bias/algorithmic fairness has become an issue. It is problematic if a machine learning model is trained with one or more parameters that skew the output that the model provides (e.g., provide varied outputs for inputs that differ in class). Conventional methods have been employed or researched to identify and remove algorithmic bias from machine learning models. However, most algorithmic fairness research and discussion is directed to binomial classification models with class certainty. There is little research on regression fairness, and the current research is not easily generalizable to arbitrary machine learning contexts. For these reasons, among others, techniques for detecting and/or reducing or eliminating bias in machine learning models, specifically models that perform regression, are needed and beneficial.

Techniques of the present disclosure relate to detecting, reducing, or eliminating bias in trained machine learning models (e.g., models that are trained to perform regression in which relationships are identified between a dependent variable and one or more independent variables). For example, a baseline training data set associated with a group of users may be utilized to train a machine learning model. The machine learning model may be any suitable machine learning model (e.g., models that are trained with support vector machines, regression trees, neural networks, or any suitable regression algorithm) that has been trained to predict a continuous output (e.g., an output within a range) given input data. The training data used to initially train the baseline machine learning model may include no class information.

An augmented training data set may be created based on the baseline training data set. By way of example, each training data example of the baseline training data set can be augmented with a classification that may be generated by providing the data of the example as input to a classification algorithm (e.g., a Bayesian Informed Surname Geocoding (BISG) algorithm, or the like). The classification algorithm may provide output that indicates a class (e.g., class 1, class 2, class 3, etc.) to which the example has been determined to belong. A classification algorithm can be applied to the baseline data set to classify any suitable number of the examples of that data set (e.g., every example, a subset of examples, etc.). The augmented training data set may include the data of the corresponding example of the baseline training data set and a class indicator that indicates the class membership identified by the classification algorithm. Examples corresponding to a given class may be used to train one or more class-aware machine learning models. Output(s) of the class-aware machine learning models may be used to detect bias in the baseline machine learning model.

An output of the classification algorithm (or data derived based on the classification provided by the algorithm) may include a probability distribution that identifies (e.g., by percentages or otherwise), how many of the baseline training data set examples were identified as belonging to each class of the set of classes assigned by the classification algorithm (e.g., 30% of examples were classified as class 1, 50% examples were classified as class 2, and 20% of examples were classified as class 3). Each class-aware machine learning model may be trained using a subset of the augmented training data set that correspond to a single class (e.g., examples corresponding to a particular class assigned using the classification algorithm such as BISG). For example, a class-aware machine learning model corresponding to class 1 may be trained using augmented training data set examples classified as belonging to class 1. A separate class-aware machine learning model corresponding to class 2 may be trained using augmented training data set examples that were classified as belonging to class 2. Yet another class-aware machine learning model corresponding to class 3 may be trained using augmented training data set examples that were classified as belonging to class 3. The number of class-aware machine learning models may depend on the number of classes in the set of classes utilized by the classification algorithm.

In some embodiments, the baseline training data set may be randomly sampled and assigned classes based at least in part on the probability distribution identified by the classification algorithm (or a probability distribution derived from the classifications provided by the classification algorithm). These examples may be used to train the class-aware machine learning models and/or as additional training data with which the class-aware machine learning models may be retrained/finetuned.

Given the same inputs, outputs of the class-aware machine learning models may be compared to outputs of the baseline machine learning model to determine if the baseline machine learning model is biased/algorithmically fair. For example, if the class-aware machine learning model(s) and the baseline machine learning model produce disparate outputs for the same inputs, then it may be determined that the baseline machine learning model is biased. To determine whether the baseline machine learning model is biased, a confidence interval may be generated for each class-aware machine learning model based on pairs of outputs of the baseline machine learning model and the class-aware machine learning model. If any of the confidence intervals corresponding to the class-aware machine learning models lacks a zero value, the baseline machine learning model may be identified as being biased. Conversely, if each of the confidence intervals corresponding to the class-aware machine learning models include a zero value, the baseline machine learning model may be identified as lacking bias, and the process may conclude. If the baseline machine learning model is identified as being biased, a correlation analysis may be used to identify one or more parameters that highly correlates (e.g., over a threshold degree of correlation) to the baseline machine learning model's outputs (or corresponding class-aware machine learning model outputs) and that parameter or parameters may be removed from the baseline training data set and the process may be repeated using the modified baseline training data set.

This process may be repeated any suitable number of times. Each iteration may identify whether the models produce disparate outputs (e.g., based on identifying confidence intervals from the outputs, as discussed above). For each iteration, if the generated confidence intervals indicate bias (e.g., any of the confidence intervals lack a zero value), one or more additional parameters may be removed from the modified training data set and the process may be repeated. Once an iteration has occurred in which the class-aware models and the machine learning model are in agreement (e.g., all of the confidence intervals include a zero value), the baseline machine learning model may be deemed unbiased and the process may conclude.

The disclosed techniques provide significant technical improvements to machine learning model training and provide specific improvements to machine learning by detecting and reducing bias in a machine learning model through identifying and removing parameters that disadvantageously skew the model's output. A biased model may produce subsequent skewed/inaccurate predictions that, depending on the context in which the model is used, may lead to serious consequences in wasted processing and/or storage resources, among other drawbacks. Conventional techniques for reducing bias in regression models included trial and error, manual based techniques, which required highly skilled personnel that have a deep understanding of machine-learning. The disclosed techniques alleviate the need for these highly trained personnel and may be utilized for any arbitrary machine learning algorithm (e.g., regression models) and incorporate uncertainty in class assignment (uncertainty in the class assignment identified by the classification algorithm discussed herein). In some use cases, the process may be utilized to reduce bias in any suitable number of machine learning models (e.g., multiple machine learning models used in sequence where the output of one is provided as input to another, or otherwise being executed as part of a pipeline (sequentially or in parallel)).

FIG. 1 is a simplified example flow 100 for detecting and/or correcting bias in a machine learning model, in accordance with at least one embodiment. The operations discussed in connection with FIG. 1 may be performed with a bias detection engine (BDE) 102. In some embodiments, BDE 102 may be implemented by one or more computer(s), as a service, within an application, or the like. The operations discussed in connection with FIG. 1 may be performed in any suitable order. More or fewer operations than those depicted in FIG. 1 may be employed without diverting from this disclosure.

By way of example, at 120, BDE 102 may utilize a baseline training data set 111 to train baseline machine learning model 107 to predict an output value for an observation (e.g., an example, an instance of input data). As a non-limiting example, baseline training data set 111 may include examples that individually include user data (e.g., names, historical website viewing history, age, addresses, contact information, or any suitable data related to a user) in a machine-readable list (e.g., comma separated variable format). The baseline training data 111 may be used to train the baseline machine learning model 107 to predict one or more continuous output values (e.g., one or more confidence scores, etc.).

At 122, a classification algorithm 106 (e.g., Bayesian Informed Surname Geocoding (BISG), or the like) may be executed on the examples of the baseline training data set 111 to assign a class to each example. For example, the classification algorithm 106 may be an algorithm that classifies data of an example as belonging to one of a set of classes (e.g., Class 1, Class 2, Class 3). The set of classes may include any suitable number of classes.

At 124, a second training data set (e.g., modified training data set 113, including examples 115) may be generated by combining the baseline training data set examples (e.g., examples 109) with the classes identified by classification algorithm 106. Each of the examples 115 may include the data from examples 109 and a class indicator identifying a class assigned by the classification algorithm 106. In some embodiments, the classification algorithm 106 may output a probability distribution that indicates predictions of class membership across the training data set (e.g., a percentage of examples belonging to Class 1, a percentage of examples belonging to Class 2, a percentage of examples belonging to Class 3).

At 126, examples (e.g., examples 115 or examples 109 that correspond to a given class as identified by examples 115) may be used to train one or more of the class-aware machine learning model(s) 119 to predict the output value associated with the input data of the applicable class. In some embodiments, the examples provided as input may be a subset of the modified training data set 113. In some embodiments, the class indicator of examples 115 may not be utilized in examples provided to the class-aware machine learning model(s) 119 during training. However, the class-aware machine learning model(s) 119 may be individually provided examples that are homogenous in class (examples which have been classified as belonging to a common class).

In some embodiments, one or more sample sets may be identified from the baseline training data set 111 and assigned classifications based at least in part on the probability distribution of the class assignments of the classification algorithm 106. The sample set(s) and their corresponding class assignments may be used to train, retrain, or finetune the class-aware machine learning models 119.

At 128, the BDE 102 may conduct a statistical test to determine if the class-aware machine learning models 119 produce significantly different output compared to the output of the baseline machine learning model 107 when provided the same input. To conduct the statistical test, an input may be provided to the baseline machine learning model 107 and each of the class-aware machine learning models 119 and differences between the baseline machine learning model outputs and the corresponding class-aware machine learning model outputs may be identified. Confidence intervals (e.g., confidence intervals 121) may be generated around the differences between the baseline machine learning model outputs and the class-aware machine learning models 119 outputs. Any suitable number of confidence intervals may be generated through a process including sampling the baseline training data set 111 (e.g., selecting random examples of the examples 109) and creating multiple predictions using the class-aware machine learning models 119, making use of uncertainty in class assignment, when that uncertainty is present.

In some embodiments, a mean or an average of differences between pairs of model outputs comprising 1) an output provided by one of class-aware machine learning model(s) 119 and 2) an output provided by the baseline machine learning model 107 may identified for a sample set. Any suitable number of means or averages may be identified in a similar manner across multiple sample sets. The means, averages, or individual differences may be used to generate confidence intervals 121.

If the confidence intervals 121 indicate that the models agree (e.g., each of the confidence intervals 121 include a zero value), the BDE 102 may determine that no bias is detected in baseline machine learning model 107, and method 100 may conclude. Alternatively, if the models do not agree (e.g., one or more of the confidence intervals 121 lack a zero value), the BDE 102 may determine that a bias has been detected and the method 100 may proceed to 130.

At 130, the BDE 102 may identify and remove one or more parameters (e.g., parameter(s) 132) potentially causing bias in the baseline machine learning model 107. For example, the BDE 102 may identify, as one of parameter(s) 132, a parameter with a high correlation to a class (e.g., a parameter potentially contributing to the difference between the output of the baseline machine learning model 111 and the outputs of the class-aware models 119). In some embodiments, the parameter(s) 132 may include one or more of the parameters having the highest correlation to the output of baseline machine learning model 107 and/or the output of one of class-aware machine learning models 119 (e.g., a class-aware machine learning model corresponding to a confidence interval that lacks a zero value). In some embodiments, the BDE 102 may remove parameter(s) 132 from the baseline training data set 111, thereby generating modified training data set 134. The method may return to 120 where the baseline machine learning model 107 may be retrained with the modified training data set 134 to generate modified machine learning model 136.

At 138, operations may be performed to determine that the bias of the baseline machine learning model 107 has been corrected. By way of example, the operations of flow 100 described above may be repeated any suitable number of times, removing any suitable number of parameters with each iteration, until the confidence intervals 121 generated from the pair of outputs (e.g., an output of a class-aware machine learning model and an output of the modified machine learning model 136) each contain a zero value (e.g., indicating no difference and/or bias exists). When the models agree (e.g., each of the confidence intervals 121 include a zero value), as described above, the bias originally detected in the baseline machine learning model 107 may be deemed corrected (and the modified machine learning model 136 may be subsequently used for any suitable purpose.

Figure 2:
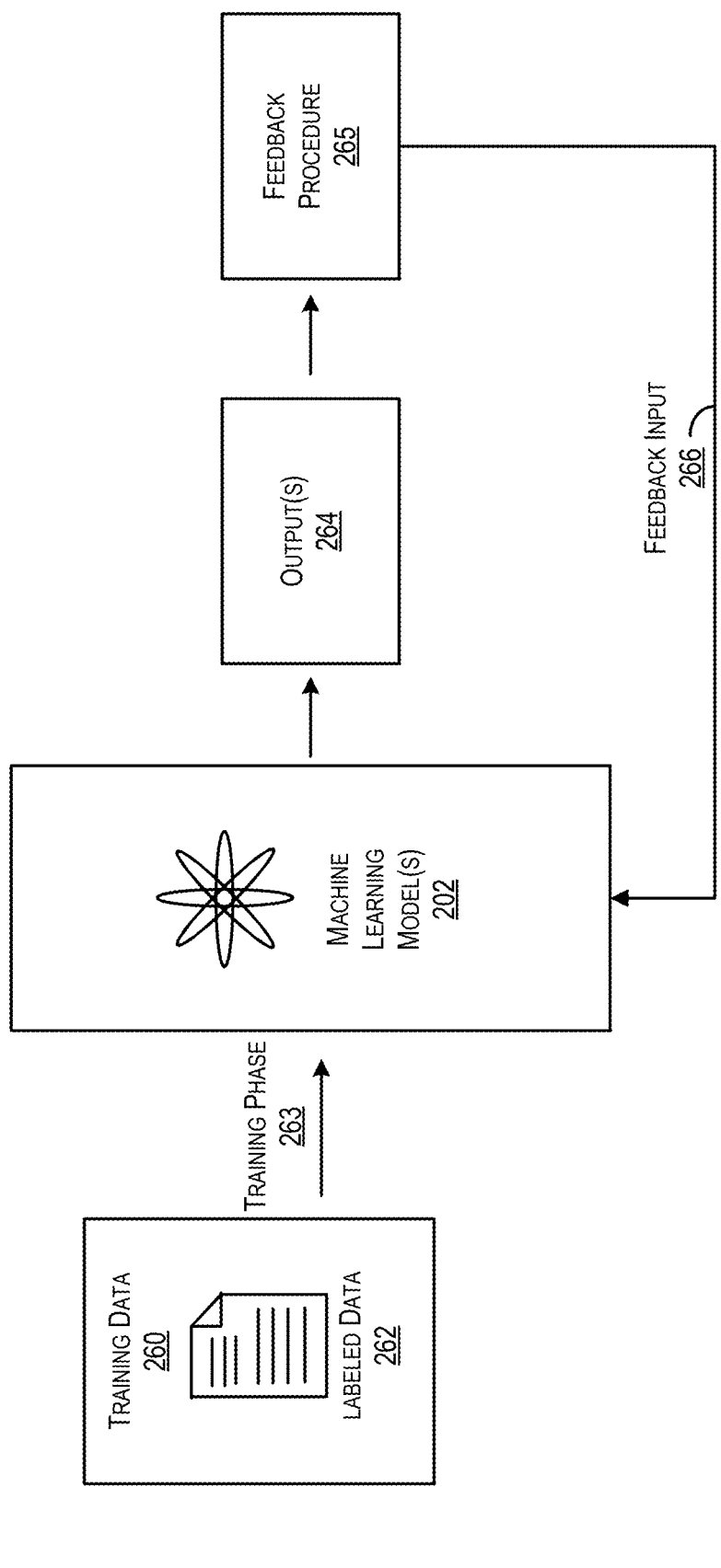
FIG. 2 is a simplified block diagram illustrating an example process for training machine learning models, in accordance with at least one embodiment.

FIG. 2 is a simplified block diagram illustrating an example method 200 for training machine learning model(s) 202, in accordance with at least one embodiment. In some embodiments, the machine learning model(s) 202 (e.g., an example of which includes machine learning model 107 of FIG. 1, any of class-aware machine learning model(s) 119, or the like) may be trained using any suitable machine learning algorithms (e.g., a supervised machine learning algorithm, etc.) and any suitable number of training data sets (e.g., baseline training data set 111, modified training data set 113, etc.). A supervised machine learning algorithm refers to a machine learning task that includes learning an inferred function that maps an input to an output based on a labeled training data set for which example input/output pairs are known (e.g., labeled data 262).

At least one model of machine learning model(s) 202 may be trained to provide an output associated with a corresponding input. The inputs (e.g., any suitable portion of training data 260) can include data sets from sources including, without limitation, financial institution databases, pharmaceutical databases, medical databases, clinical research databases, marketing databases, or combinations thereof. The machine learning model(s) 202 may predict output(s) 264 (e.g., scores, continuous values, etc.) associated with any suitable number of examples (e.g., an example of the training data 260) In some embodiments, the training data 260 for training these particular machine learning model(s) 202 may include any suitable combination of data from one or more data sets (e.g., baseline training data set 111, modified training data set 113, etc.).

The machine learning model(s) 202 can be trained during a training phase 263 using a supervised learning algorithm and labeled data 262 (e.g., baseline training data set 111) to identify the outputs (e.g., output(s) 264, etc.) described in the examples above. A likelihood value may be a percentage, a confidence value or the like that indicates a score or prediction. Labeled data 262 may be any suitable portion of training data 260 that can be used to train model(s) to produce the output(s) 264. In some embodiments, labeled data 262 may include labels/scores that identify values as determined by users and/or system defined values based on known values. Using the labeled data 262, a model (e.g., an inferred function) may be learned that maps an input to an output (e.g., one or more predicted scores).

The training data 260 may be utilized during the training phase 263 to train the machine learning model(s) 202. For example, a percentage of labeled data 262 (examples that are associated with classification labels/scores) may be utilized to train the machine learning model(s) 202. At any suitable time after training, the machine learning model(s) 202 may be evaluated to assess quality. In a non-limiting example, the accuracy of output(s) 264 with respect to the classification scores/labels corresponding to labeled data 262 may be assessed. By way of example, a portion of the examples of labeled data 262 may be utilized as input to the machine learning model(s) 202 in order to generate output(s) 264. An example of the labeled data 262 may be provided as input, and the corresponding output (e.g., output(s) 264) may be compared to the label/score already known to be associated with the example (e.g. to provide a measure of fidelity). If some portion of the output(s) 264 (e.g., a label/score) matches the example label/score, that portion of the output may be deemed accurate. Any suitable number of labeled examples may be utilized, and a number of accurate labels/scores may be compared to the total number of examples provided (and/or the total number of labels previously identified) to determine an accuracy value that quantifies a degree of accuracy for the model. For example, if eighty out of one hundred and twenty of the input examples generate output labels that match the previously known example labels, the model being assessed may be determined to be sixty-six percent accurate.

In various embodiments, the machine learning model(s) 202 may be utilized for subsequent inputs, the subsequent output generated by the machine learning model(s) 202 may be added to corresponding input and used to retrain, update, or finetune the machine learning model(s) 202 by way of executing a feedback procedure 265 that includes providing feedback input 266 as input. In some embodiments, the example may not be used to retrain, update, or finetune the model until feedback procedure 265 is executed. In some embodiments, feedback procedure 265 may include presenting the feedback input 266 (e.g., the corresponding output generated for the example by one of the machine learning model(s) 202) to a user and receiving user input indicating whether the output generated is correct for the given example. The training process depicted in FIG. 2 may be performed any suitable number of times at any suitable interval and/or according to any suitable schedule such that the accuracy of the machine learning model(s) 202 are improved over time.

In some embodiments, the labeled data 262 may include one or more output scores used in regression or classifications/scores provided by a classification algorithm (e.g., the classification algorithm 106 of FIG. 1). In some embodiments (e.g., when training one of class-aware machine learning model(s) 119), the training data 260 may include examples corresponding to one of a set of classes (e.g., class 1, class 2, class 3, etc.) such as those assigned by the classification algorithm 106 of FIG. 1.

Output of the classification algorithm may include a probability distribution that identifies (e.g., by percentages or otherwise), how much of the training data 260 that was provided as input was identified by the classification algorithm as belonging to each class of a second set of classes. A class-aware machine learning model (e.g., class-aware machine learning model 1 of FIG. 1) may be trained using any suitable portion of the examples of training data 260 that were classified by the classification algorithm as belonging to class 1. A separate class-aware machine learning model (e.g., class-aware machine learning model 2 of FIG. 1) may be trained using any suitable portion of the examples of training data 260 that were classified by the classification algorithm as belonging to class 2. Yet another class-aware machine learning model (e.g., class-aware machine learning model 3 of FIG. 1) may be trained using any suitable portion of the examples of training data 260 that were classified by the classification algorithm as belonging to class 3.

In some embodiments, the initial training data set (e.g., baseline training data set 111 of FIG. 1) may be randomly sampled and assigned classes based at least in part on the probability distribution identified from the classifications provided by the classification algorithm. These further examples may be used as training data 260 with which the class-aware machine learning models may be trained, updated, or finetuned.

Figure 3:
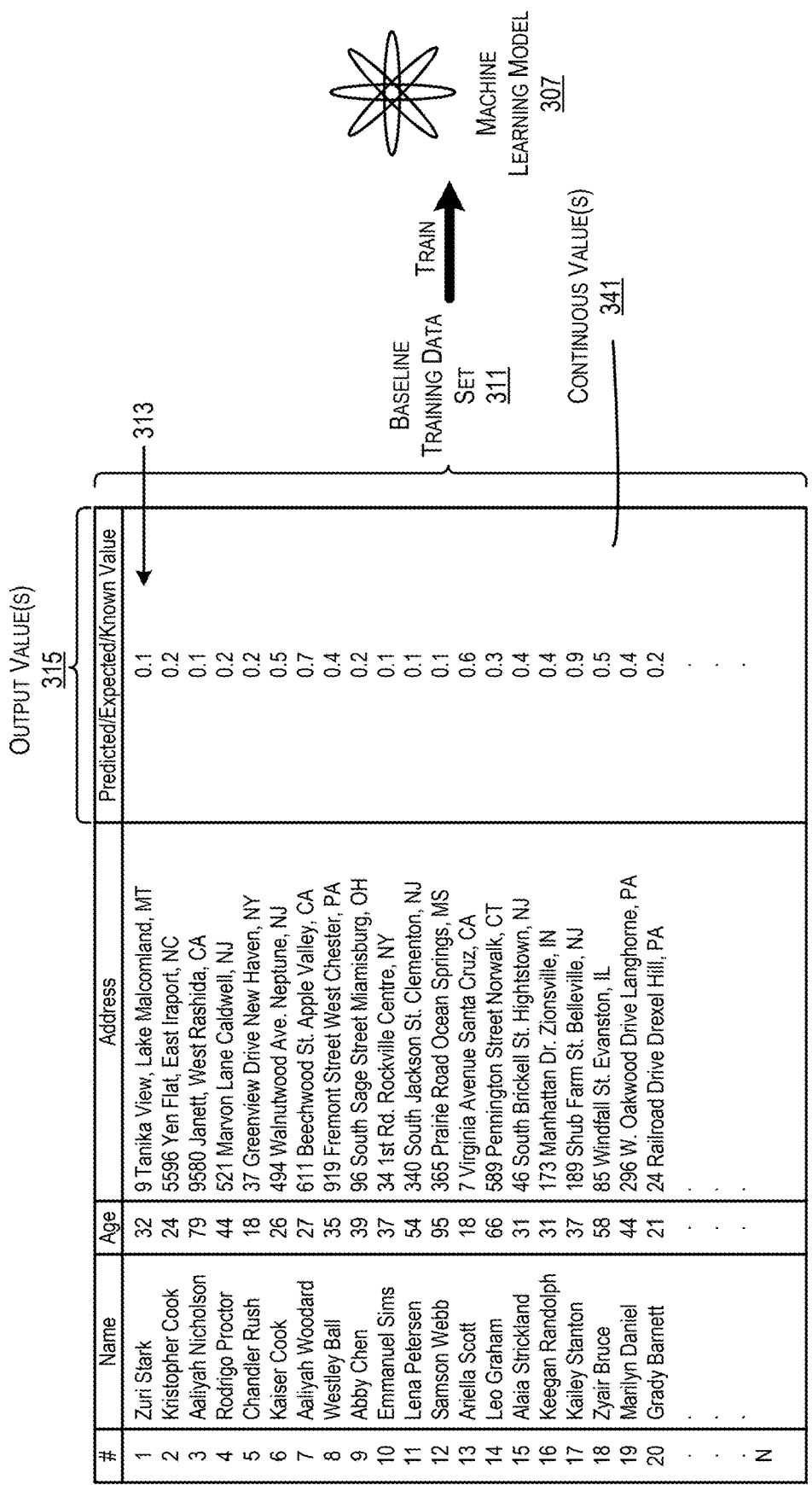
FIG. 3 is a first simplified example data set for training machine learning models, in accordance with at least one embodiment.

FIG. 3 is a first simplified example diagram 300 illustrating a data set for training machine learning models (e.g., machine learning model 307, and example of machine learning model(s) 202 of FIG. 2 and/or machine learning model 107 of FIG. 1, etc.), in accordance with at least one embodiment. By way of example, a baseline training data set 311 (e.g., an example of the baseline training data set 111 of FIG. 1) may include a number of data fields (e.g., name, age, address, etc.) related to one or more users. While this example is directed towards user data, it should not be considered limiting, and any suitable data type may be used that may be suitably delineated by various different parameter attributes. The baseline training data set 311 may include an output variable for regression (e.g., output value(s) 315, each a predicted/expected/known value associated with a respective examples). Although output value(s) 315 are depicted as providing a single output value for each example, it should be appreciated that output value(s) 315 may include any suitable number of values for a given example. The baseline training data set 311 may be provided as input (e.g., during training phase 263 with respect to FIG. 2) to train the machine learning model 307.

FIG. 4 is a second simplified example diagram 400 for a data set for training machine learning model (e.g., the machine learning model(s) 202 of FIG. 2), in accordance with at least one embodiment. Second training data set 413 (e.g., an example of the modified training data set 113 of FIG. 1) may be generated based, at least in part, on providing examples of a baseline training data set (e.g., baseline training data set 111 of FIG. 1) as input to a classification algorithm (e.g., classification algorithm 106 of FIG. 1). Each of the examples of second training data set 113 may correspond to the examples of the baseline training data set 311 of FIG. 3. Output value(s) 440 may correspond to output value(s) 315 of FIG. 3. A class membership (e.g., indicated by class indicators 442) may be assigned to each example based at least in part on the output/class identified by the classification algorithm (e.g., classification algorithm 106).

Figure 5:
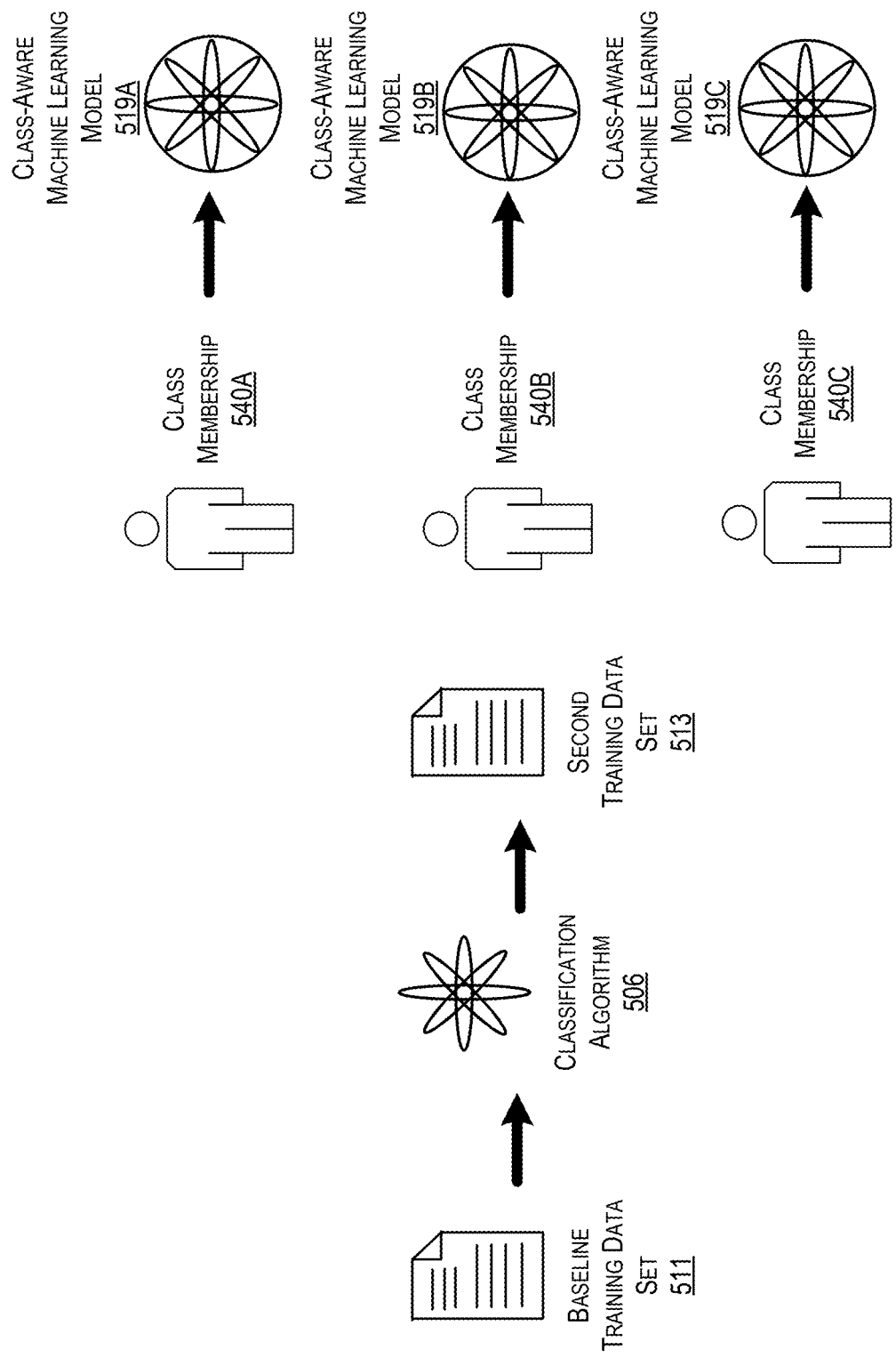
FIG. 5 is a simplified example process for generating class-aware machine learning model(s), in accordance with at least one embodiment.

FIG. 5 is a simplified example diagram 500 depicting a process for generating class-aware machine learning model(s) (e.g., class-aware machine learning model 519A, 519B, and 519C, collectively referred to as "class-aware machine learning models 519")), in accordance with at least one embodiment. A baseline training data set 511 (e.g., an example of baseline training data set 111 of FIG. 1, baseline training data set 311 of FIG. 3, etc.) may be provided as input into a classification algorithm 506 (e.g., classification algorithm 106 of FIG. 1) to generate second training data set 513 (e.g., modified training data set 113 of FIG. 1, second training data set 413 of FIG. 4, etc.). The classification algorithm 506 may include, without limitation, a Bayesian Improved Surname Geocoding (BISG) algorithm, a Bayesian Improved First Name Surname Geocoding (BIFSG) algorithm, random forest classification algorithms, Naïve Bayes classification algorithms, support vector algorithms, or combinations thereof. The classification algorithm 506 may provide an output including one or more class memberships. For example, the classification algorithm 506 may classify each examples of baseline training data set 511 as having one of class memberships 540A-540C corresponding to class 1, class 2, and class 3 of the previous examples. Any suitable number of class memberships using any suitable number of classification algorithms 506 are anticipated within the scope of this disclosure.

In some embodiments, a subset of examples from the second training data set 513 (e.g., second training data set 413 of FIG. 4) may be provided to train class-aware machine learning model(s) 519. The class-aware machine learning model(s) 519 may be machine learning models trained on a specific class membership. For example, any suitable number of examples of second training data set 513 that correspond to class 540A may be provided as input to train class-aware machine learning model 519A (e.g., a model corresponding to class 1 of a set of classes), any suitable number of examples of second training data set 513 that correspond to class 540B may be provided to train class-aware machine learning model 519B (e.g., a model corresponding to class 2 of the set of classes), and any suitable number of examples of second training data set 513 that correspond to class 540C may be provided as input to class-aware machine learning model 519C (e.g., a model corresponding to class 3 of the set of classes). The subset of examples may be random or may be chosen based on various parameters (e.g., correlations, location, age group, etc.). Although not depicted, the class-aware machine learning model(s) 519 may each provide output that that includes a continuous value.

Figure 6:
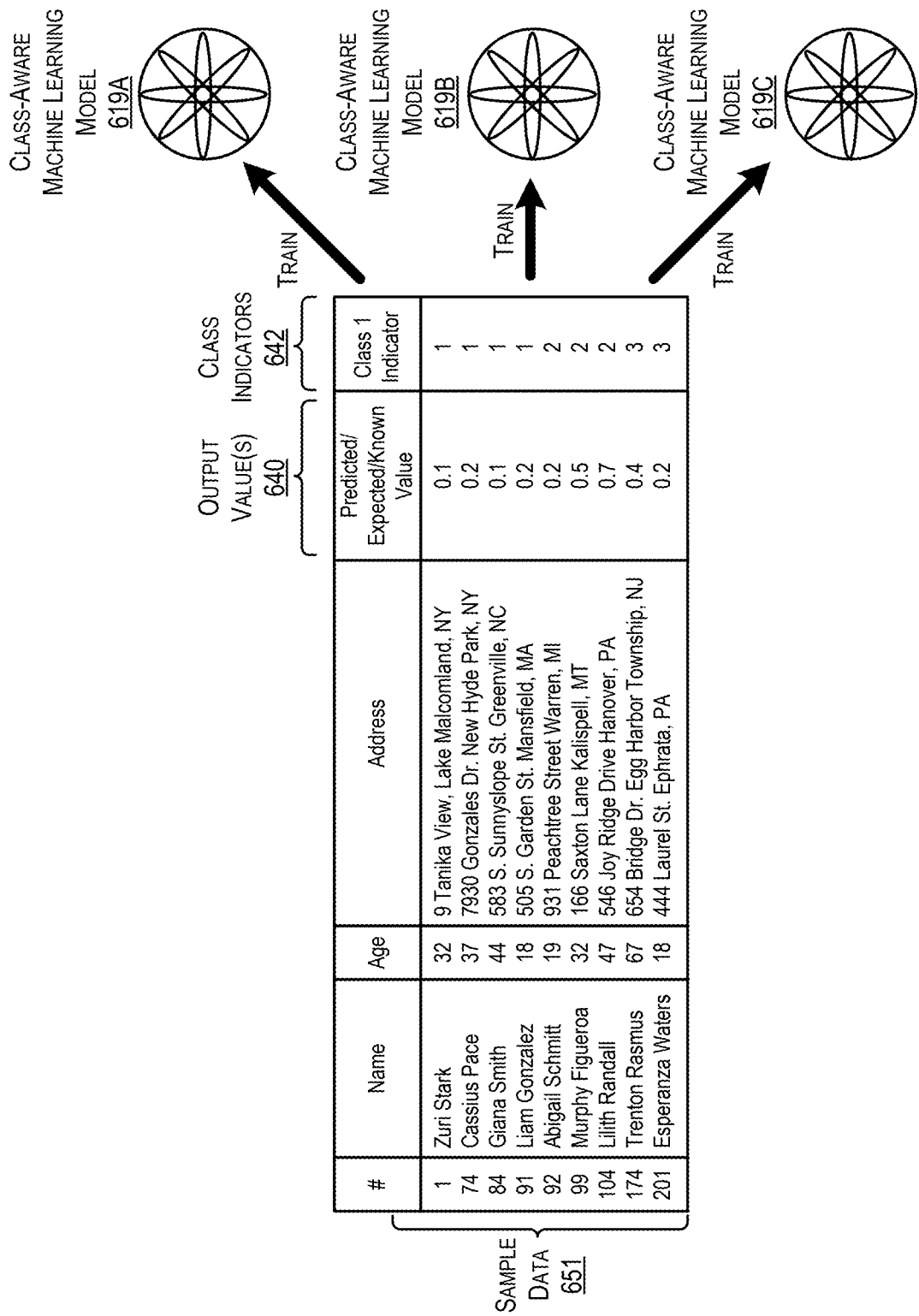
FIG. 6 is a simplified example process for training class-aware machine learning model(s), in accordance with at least one embodiment.

FIG. 6 is a simplified example diagram 600 illustrating a process for training, retraining, or finetuning class-aware machine learning model(s) 619 (e.g., class-aware machine learning model(s) 619A, 619B, and 619C, each an example of the class-aware machine learning model(s) 119 of FIG. 1), in accordance with at least one embodiment. By way of example, refinement of the class-aware machine learning model(s) 619A-C (collectively, "class-aware machine learning model(s) 619") may be performed by generating sample data 651 from a baseline training data set (e.g., baseline training data set 111 of FIG. 1). The sample data 651 may be a random sampling of data, or examples, from the baseline training data set. Each portion of data may have a class assigned (e.g., from a set of classes including class 1, class 2, and class 3). Class indicators 642 (e.g., class indicators 442 of FIG. 4) may indicate the class to which an example has been assigned membership. The sample data 651 may be used to train, retrain, or finetune the class-aware machine learning models 619. In this manner, the class-aware machine learning models 619 may be class oriented and well suited to determinations for specific classes.

In some embodiments, an output of the classification (or data identified based on the classification provided by the algorithm) may be a probability distribution that identifies (e.g., by percentages or otherwise), how much of the baseline training data set (e.g., baseline training data set 511 of FIG. 5) was identified as belonging to each class of the set of classes assigned by the classification algorithm (e.g., 30% of examples were classified as class 1, 50% examples were classified as class 2, and 20% of examples were classified as class 3). In some embodiments, the baseline training data set 511 may be randomly sampled and assigned classes based at least in part on the probability distribution identified from the classifications provided by the classification algorithm. By way of example, sample data 651 may include 100 examples obtained randomly from the baseline training data set 511. The first 30 examples of sample data 651 may be assigned class 1, the next 50 examples may be assigned class 2, and the last 20 examples may be assigned class 3, per the example probability distribution. Sample data 651 may be used to train the class-aware machine learning models 619 and/or as additional training data with which the class-aware machine learning models 619 may be retrained/finetuned.

Class-aware machine learning model 619A-C (e.g., each and example of the class-aware machine learning model(s) 119 of FIG. 1) may be trained/retrained/finetuned using any suitable portion of the sample data 651 that includes the class indicator(s) 642. By way of example, class-aware machine learning model 619A (e.g., class-aware machine learning model 1 of FIG. 1) may be retrained with samples from sample data 651 that are associated with a class indicator that indicates the sample belongs to class 1. Class-aware machine learning model 619B (e.g., class-aware machine learning model 2 of FIG. 1) may be retrained with samples from sample data 651 that are associated with a class indicator that indicates the sample belongs to class 2. Class-aware machine learning model 619C (e.g., class-aware machine learning model 3 of FIG. 1) may be retrained with samples from sample data 651 that are associated with a class indicator that indicates the sample belongs to class 3.

Figure 7:
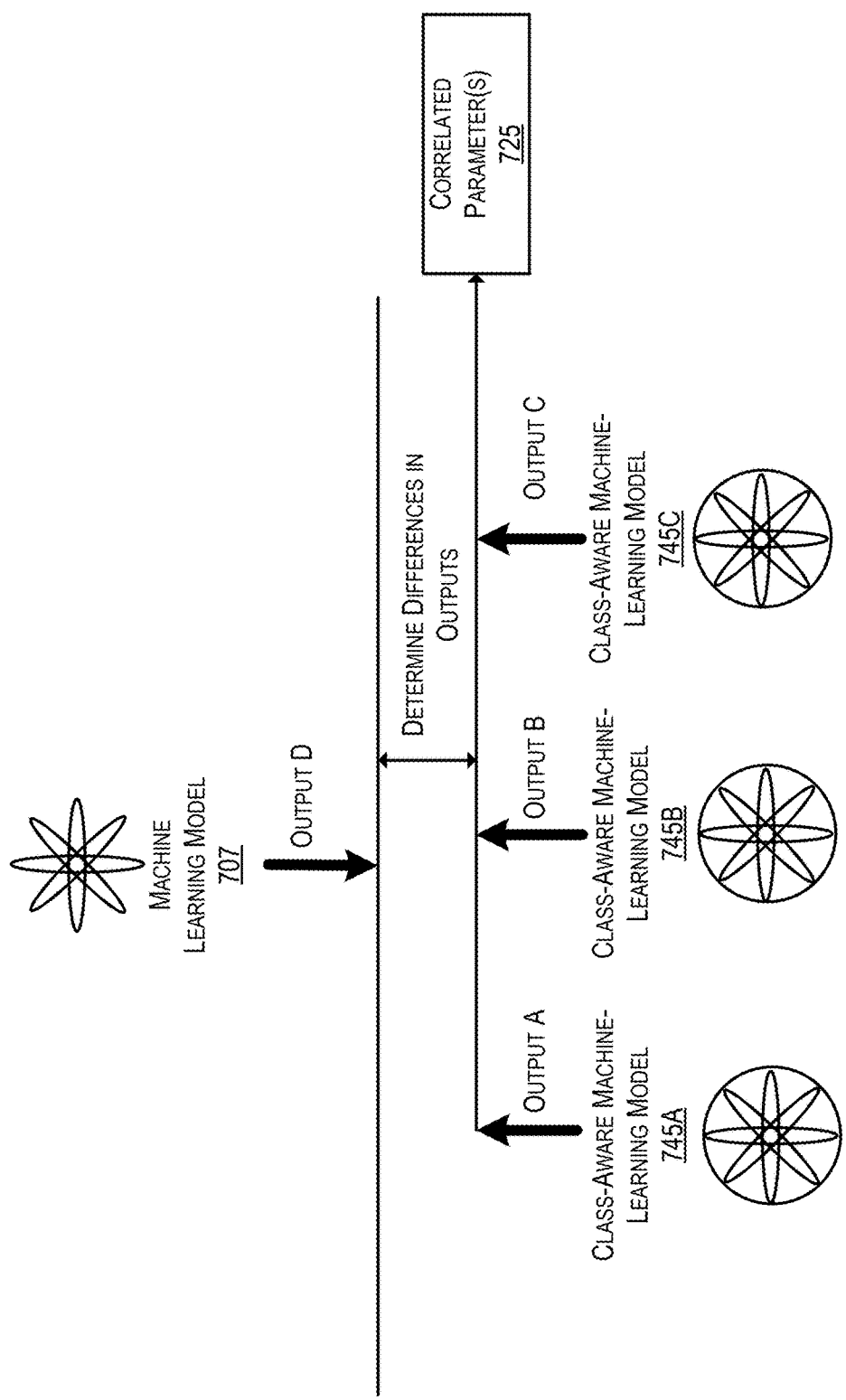
FIG. 7 is a simplified example process for determining differences between machine learning models and class-aware machine learning model(s), in accordance with at least one embodiment.

FIG. 7 is a simplified example diagram 700 for a process for determining differences between a machine learning model (e.g., machine learning model 707, an example of the baseline machine learning model 107 of FIG. 1) and one or more of the class-aware machine learning models 745A-C (e.g., class-aware machine learning model(s) 119 of FIG. 1, class-aware machine learning models 519A-C of FIG. 5, class-aware machine learning model(s) 619A-C of FIG. 6, etc.), in accordance with at least one embodiment. Class-aware machine learning model(s) 745A-C may collectively be referred to as "class-aware machine learning model(s) 745. Class-aware machine learning model(s) 745 may be generated by inputting class-specific portions of sample data 651 of FIG. 6 into class-aware machine learning model(s) 619A-C, respectively. The outputs (e.g., outputs A-C) may be compared to the output of machine learning model 107 (e.g., output D) to determine a difference between respective outputs of the class-aware machine learning models 745 and the machine learning model 707. For example, outputs from each retrained class-aware machine learning model 745A, 745B, 745C (e.g., output A, output, and output C, respectively), may be individually compared to output of the machine learning model(s) 707 (e.g., output D) for each example. In some embodiments, the differences may be averages or otherwise combined to generate a combined difference value. As described above, if there is no difference (or less than a predefined difference threshold value indicating an acceptable amount of difference) between the outputs A-C (individually, or as combined) and output D, the machine learning model 707, the machine learning model 707 may be deemed as lacking bias (or have less than an acceptable amount of bias). If, however, the individual differences (or combined difference) is greater than zero (or greater than the predefined difference threshold value) the machine learning model 707 may be deemed to be biased. In some embodiments, when the machine learning model 707 is deemed to be biased, one or more correlated parameter(s) 725 may be identified. For example, a correlation technique may be employed to identify one or more of the fields (e.g., name, age, address, with respect to FIG. 4) that is/are highly correlated to outputs A, B, or C (e.g., outputs corresponding to the first set of classes such as class A, class B, class C, etc.). The highly correlated parameter(s) (e.g., correlated parameter(s) 725 may be removed from the training data set (e.g., training data 260 of FIG. 2) and the machine learning model 707 and class-aware machine learning models 745 may be retrained using the method 200 of FIG. 2. As a non-limited example, correlated parameter(s) 725 may include any suitable combination of one or more data fields of the baseline training data set 111 of FIG. 1 (e.g., name, age, address, as depicted in baseline training data set 311 of FIG. 3).

The processes (e.g., process 200 of FIG. 2) of training the machine learning model 707 and class-aware machine learning models 745 may be repeated and outputs may be once again compared to determine a difference between the output of the machine learning model 707 and the outputs of class-aware machine learning models 745. Each iteration for which a difference is identified, one or more correlated parameters may be identified, removed from the training data and the models may be retrained. The process may be repeated any suitable number of times until no difference (or at least a difference that is less than the predefined difference threshold value) is identified. When this criteria is reached, the machine learning model 707 may be deemed as lacking bias and may be subsequently used for any suitable purpose.

As a non-limiting example, during a first iteration, an unacceptable difference (e.g., a non-zero difference, a difference that exceeds a predefined difference threshold value, etc.) may be identified between the output of the machine learning model 707 and the outputs of class-aware machine learning models 745 (e.g., individually, or collectively/averaged, etc.), indicating the machine learning model 707 is biased. A correlation technique may be employed to identify that the data field "address" may be highly correlated (e.g., a most-highly correlated parameter) to the output provided by machine learning model 707. Based on this correlation, the address data fields may be removed from the training data and the machine learning model 707 may be retrained. In some embodiments, the process for assigning a classification from the second set of classes as described above may be performed anew. The class-aware machine learning models may be retrained with class specific examples. Input may be provided to the machine learning model 707 and each of the class-aware machine learning models 745 and the outputs once again compared as described above. If an unacceptable difference still exists, another correlated parameter may be identified. For example, on this second iteration a correlation parameter such as "age" may be removed from the baseline training data set and the process may begin anew, including retraining machine learning model 707, classifying the modified training data using a classification algorithm, training the class-aware machine learning models 745 with class-specific examples, determining whether an unacceptable difference exists between pairs of outputs, and if an unacceptable difference exists, identifying and removing a correlated parameters that is identified as being most highly correlated to the output of machine learning model 707. In some examples, this process may repeat until a zero value is found for some or all trained class-aware machine learning models to ensure that the machine learning model 707 is unbiased.

Figure 8:
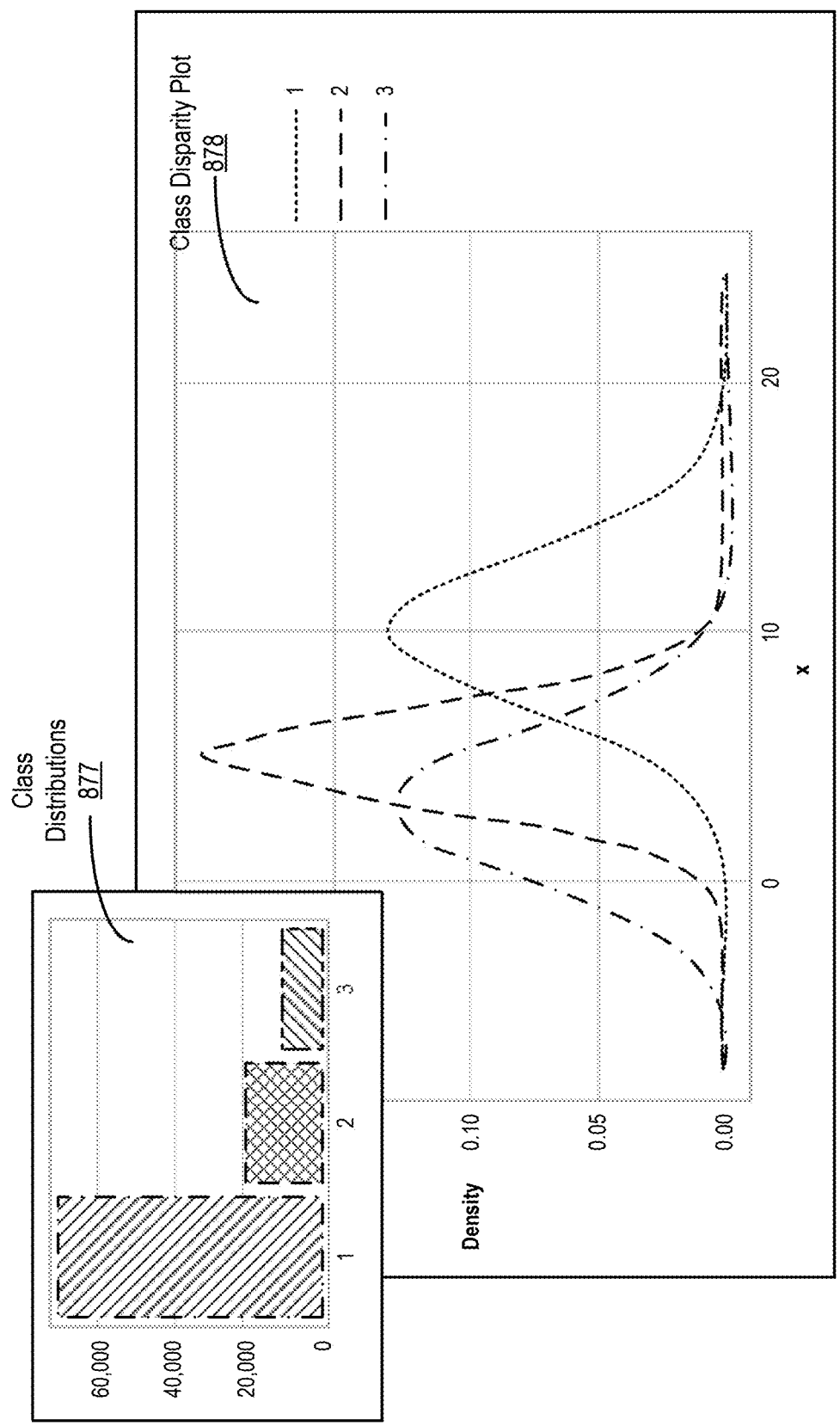
FIG. 8 is a simplified example chart illustrating disparity between classes, in accordance with at least one embodiment.

FIG. 8 is a simplified example chart 800 illustrating a disparity (in variable x, income, for example) between classes, in accordance with at least one embodiment. For an example data set (e.g., baseline training data set 311 with respect to FIG. 3), the data set may have class memberships for a set of classes (e.g., Class 1, Class 2, and Class 3, etc.) and have class distributions 877 based on the examples represented in the training data. Class disparity plot 878 represents a plot of this data where the y axis represents density (e.g., number of individuals per similar correlation parameter/class score), and the x axis represents disparate values (e.g., income, or the like). As depicted, class 2 has a higher density than either Class 1 or 2. This difference may skew and/or weight the output of a machine learning model trained with such data, resulting in biased results (e.g., a conclusion which takes into account parameters related to class memberships).

Figure 9:
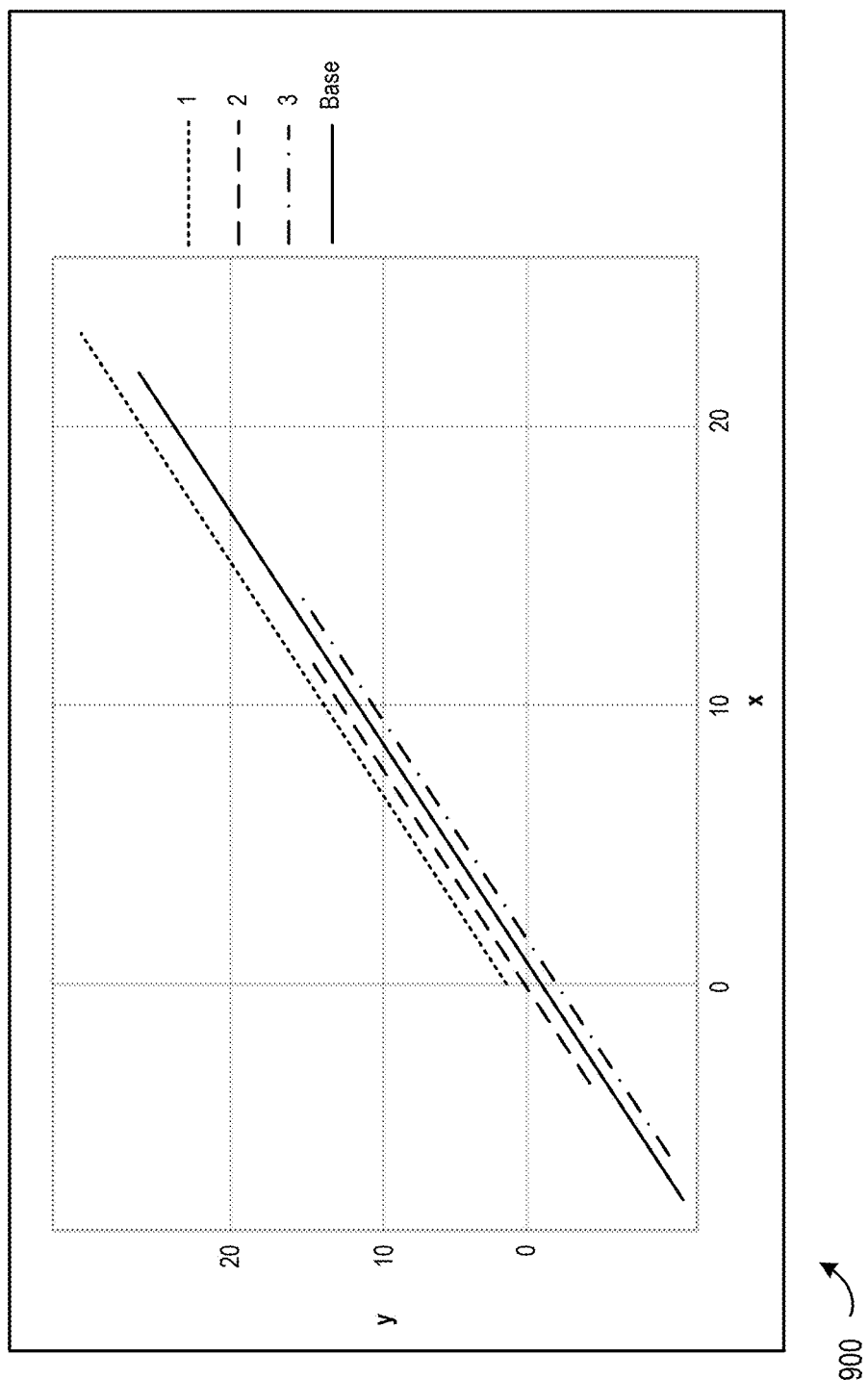
FIG. 9 is a simplified example chart illustrating machine learning model fairness between classes, in accordance with at least one embodiment.

FIG. 9 is a simplified example chart 900 illustrating machine learning model fairness between classes, in accordance with at least one embodiment. By way of example, the chart 900 represents model fairness between the output of a base model (e.g., machine learning model 707 of FIG. 7) and the outputs of class-aware machine learning models (e.g., class-aware machine learning models 745 of FIG. 7). As described above, the inputs provided to each model may result in corresponding outputs including class memberships for Class 1, Class 2, and Class 3. The chart 900 indicates similar output behaviors between models and indicates that the machine learning model 707 accurately identifies underlying relationships between variables x and y, regardless of class.

Figure 10:
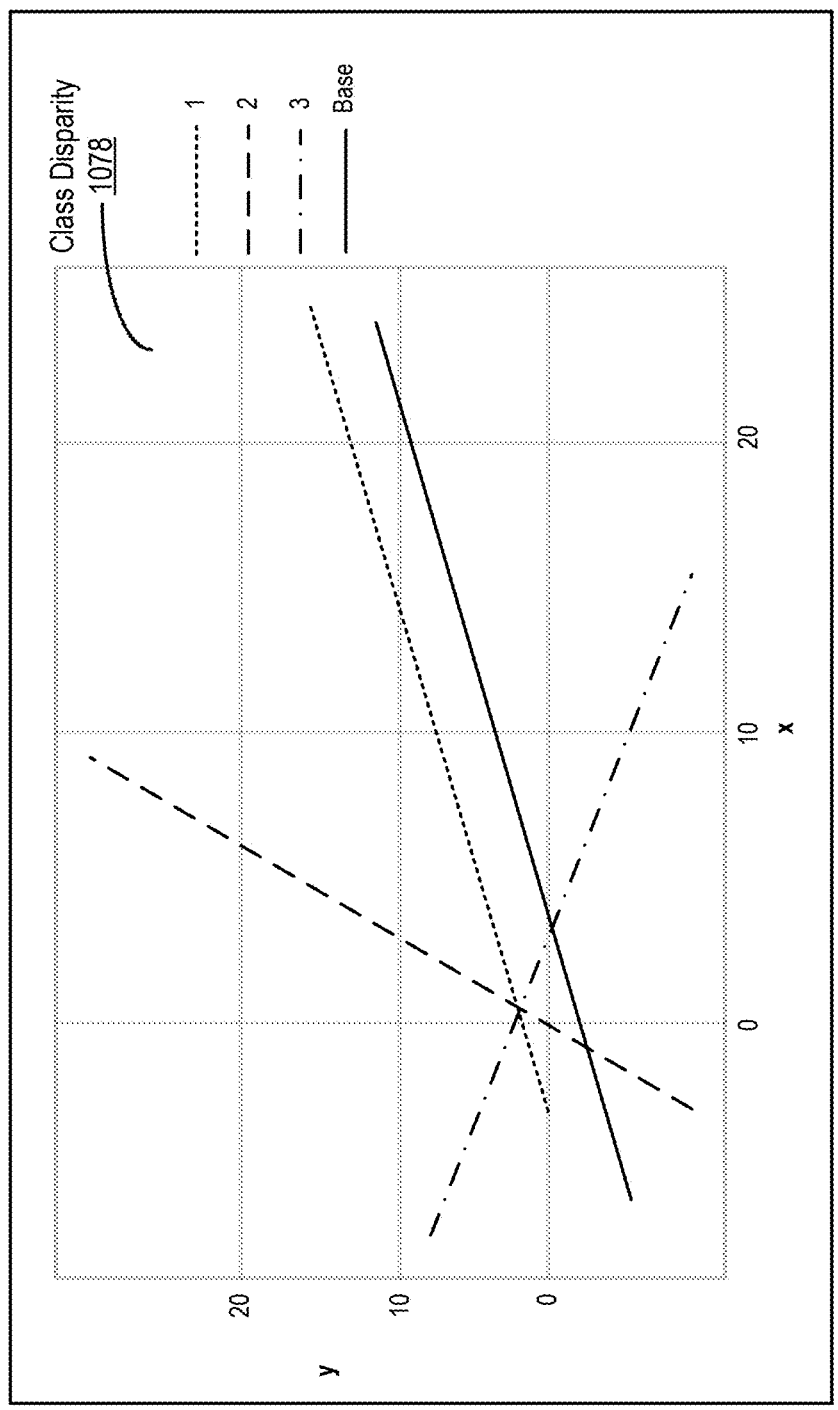
FIG. 10 is a simplified example chart illustrating machine learning model unfairness between classes, in accordance with at least one embodiment.

FIG. 10 is a simplified example chart 1000 illustrating machine learning model unfairness between classes, in accordance with at least one embodiment. By way of example, the chart 1000 demonstrates model unfairness in machine learning model 707 of FIG. 7 due to differences identified between that model's output and the outputs of class-aware machine learning models 745 (e.g., class-aware machine learning model 745A, class-aware machine learning model 745B, and class-aware machine learning model 745C, of FIG. 7) and the baseline machine learning model 107 for a data set corresponding to Classes 1, 2, and 3. The chart 1000 indicates dissimilar output behaviors between classes and indicates that the machine learning model 707 does not accurately identify underlying relationships between variables x and y.

Figure 11:
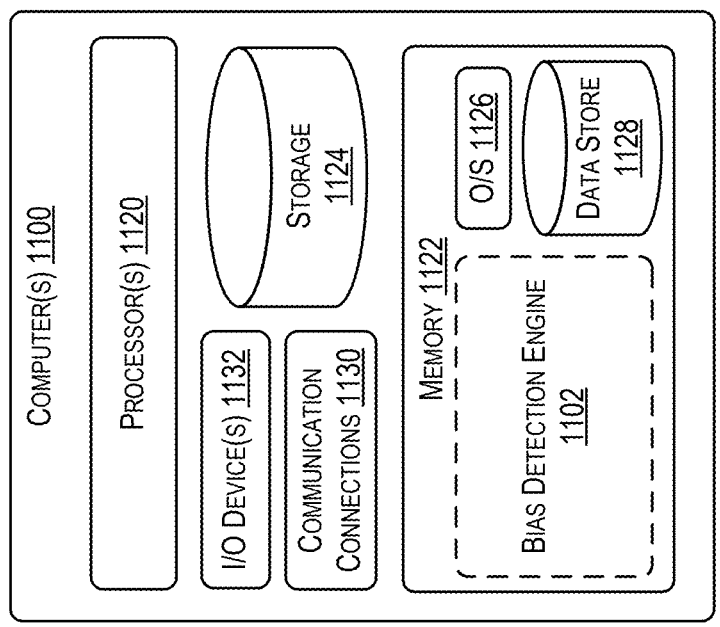
FIG. 11 is a simplified example device including a bias detection engine, in accordance with at least one embodiment.

FIG. 11 is a simplified a block diagram illustrating an example device (e.g., computer(s) 1100) including a BDE 1102, in accordance with at least one embodiment.

In some embodiments, the computer(s) 1100 may be configured to communicate via network (not depicted). Network may include any suitable combination of many different types of networks, such as cable networks, the Internet, wireless networks, cellular networks, and other private and/or public networks.

In some embodiments, the computer(s) 1100 may include one or more processors (e.g., processor(s) 1120). The processor(s) 1120 may be implemented in hardware, computer-executable instructions, firmware, or combinations thereof. Computer-executable instruction or firmware implementations of the processor(s) 1120 may include computer-executable or machine-executable instructions written in any suitable programming language.

Computer(s) 1100 may include memory 1122. The memory 1122 may store computer-executable instructions that are loadable and executable by the processor(s) 1120, as well as data generated during the execution of these programs. The memory 1122 may be volatile (such as RAM) and/or non-volatile (such as ROM, flash memory, etc.). The computer(s) 1100 may include additional storage (e.g., storage 1124), which may include removable storage and/or non-removable storage. Storage 1124 may include, but is not limited to, magnetic storage, optical disks and/or tape storage. The disk drives and their associated computer-readable media may provide non-volatile storage of computer-readable instructions, data structures, program modules, and other data for the computing devices.

The memory 1122 and/or storage 1124 may be examples of computer-readable storage media. Computer-readable storage media may include volatile, or non-volatile, removable, or non-removable media implemented in any method or technology for storage of information such as computer-readable instructions, data structures, program modules, or other data. In some embodiments, memory 1122 and the storage 1124 are examples of computer storage media. Memory 1122 and/or additional storage 1124 may include, but are not limited to, any suitable combination of PRAM, SRAM, DRAM, RAM, ROM, EEPROM, flash memory or other memory technology, CD-ROM, DVD, magnetic tape, magnetic disk storage or other magnetic storage devices, or any other medium which can be used to store desired information, and which can be accessed by the computer(s) 1100. Computer-readable media may include computer-readable instructions, program modules, or other data transmitted within a data signal, such as a carrier wave, or other transmission. However, as used herein, computer-readable storage media does not include computer-readable communication media.

The memory 1122 may include an operating system 1126 and one or more data stores 1128, and/or one or more application programs, modules, or services. The computing device may also contain communications connection(s) 1130 that allow the computer(s) 1100 to communicate with a stored database, another computing device, a server, user terminals and/or other devices (e.g., via one or more networks, not depicted). The computing device may also include I/O device(s) 1132, such as a keyboard, a mouse, a pen, a voice input device, a touch input device, a display, speakers, a printer, etc. In some embodiments, the memory 1122 may store instructions that, when executed by processor(s) 1120 implement the functionality described herein with respect to a BDE (e.g., the BDE 102 of FIG. 1). By way of example, the computer(s) 1110 may execute the instructions for BDE 1102 to provide the functionality described above in connection with FIGS. 1-7, 12 and 13.

Figure 12:
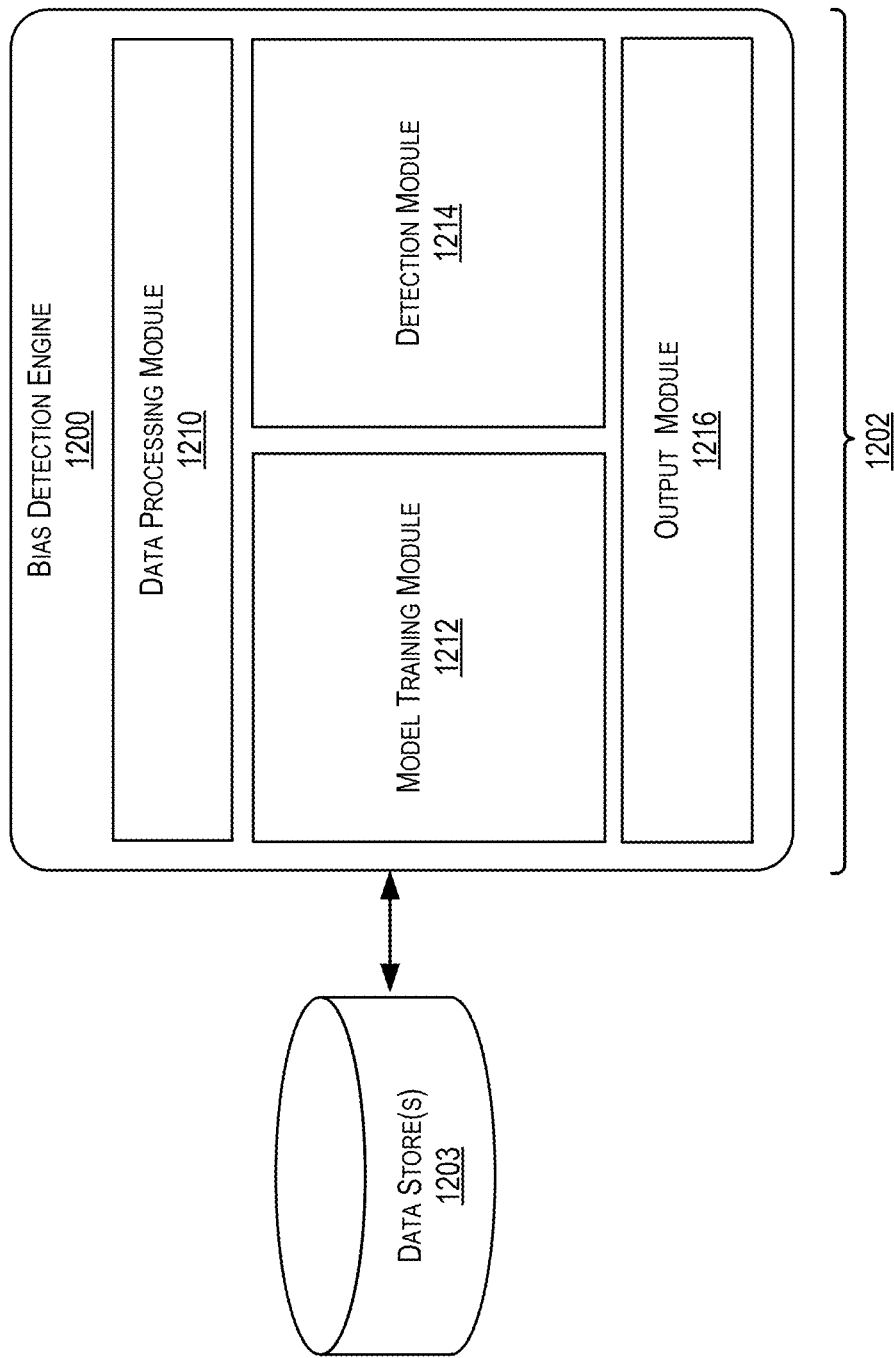
FIG. 12 is a simplified example computer architecture, in accordance with at least one embodiment.

FIG. 12 is a simplified example device including a Bias Detection Engine (BDE) 1200 (e.g., the BDE 102 of FIG. 1). The BDE 1200 may be executed by any suitable component of the computer(s) 1100 with respect to FIG. 11. The BDE 1200 may support processes, methods, operations, and techniques of FIGS. 1-4 and 13. Modules 1202 may be software modules, hardware modules, or a combination thereof. If the modules are software modules, the modules can be embodied on a computer readable medium and processed by a processor in any of the computer systems described herein. It should be noted that any module or data store described herein, may be, in some embodiments, be a service responsible for providing functionality corresponding to the module described below. The modules may be executed as part of the BDE 1200, or the modules may exist as separate modules or services external to the BDE 1200. In some embodiments, the modules may be executed by the same or different computing devices, as a service, as an application, or the like.

Data processing module 1210 may include any suitable processing components (e.g., software, hardware, firmware, etc.) operable to support functions, operations, communications, etc. between one or more of modules 1210, 1212, 1214, and 1216. The data processing module 1210 may function to transmit, receive, and/or otherwise communicate with networks over one or more communication networks (e.g., the Internet, wide area networks "WAN", local area networks "LAN", etc.). While not depicted, the data processing module 1210 need not be physically local to the BDE 1200, and may function, at least in part, as a component of a larger network (e.g., cloud network or similar). In some embodiments, the data processing module 1210 may be configured to receive or obtain any suitable training data (e.g., training data 260, baseline training data set 111 of FIG. 1) with which one or more models (e.g., machine learning model 107 of FIG. 1, class-aware machine learning model(s) 119 of FIG. 1, machine learning model(s) 202 of FIG. 2, etc.) may be trained (e.g., using the method 200 of FIG. 2). In some embodiments, the training data (e.g., baseline training data set 111 of FIG. 1) may be stored in data store(s) 1203. The data processing module 1210 may be configured to invoke any suitable functionality of the remaining modules of modules 1202. In some embodiments, the data processing module 1210 may provide any received training data to the modules 1212-1216 directly.

Model training module 1212 may include any suitable number of programs, algorithms, computer readable instructions, that, when executed, train a machine learning model (e.g., machine learning model 107 with respect to FIG. 1). In some embodiments, the machine learning model may be trained utilizing method 200 with respect to FIG. 2. The model training module 1412 may store and/or retrieve a training data set (e.g., baseline training data set 111) from any suitable source (e.g., from data processing module 1210, from data store(s) 203, etc.). For example, the model training module 1212 may retrieve baseline training data set 111 from data store(s) 1203.

Model training module 1212 may be configured to execute a classification algorithm (e.g., classification algorithm 106 of FIG. 1) to assign class memberships (e.g., indicated by class indicators 442 of FIG. 4) to each of the example. The model training module 1212 may store these class memberships as added indicators to the examples of baseline training data set, or as separate examples (e.g., the examples of second training data set 411 of FIG. 4). The model training module 1212 may obtain or derive a probability distribution indicating (by percentages or otherwise) a distribution of class memberships assigned by the classification algorithm 106. In some embodiments, the model training module 1212 may sample the baseline training data set and assign the examples of the sample class membership in accordance with the probability distribution.

The model training module 1212 may utilize one or more relevant algorithms for supervised and/or unsupervised training (e.g., using one or more algorithms discussed in FIG. 2 such as a regression algorithm). In some embodiments, the model training module 1212 may execute the operations discussed in connection with FIG. 2 to train a machine learning model (e.g., the baseline machine learning model 107) and/or any suitable number of class-aware machine learning model(s) (e.g., class-aware machine learning model(s) 119). When training a baseline machine learning model, the model training module 1212 may utilize examples of baseline training data set 111 of FIG. 1. When training a class-aware machine learning model (e.g., one of class-aware machine-learning model(s) 319 of FIG. 3), the model training module 1212 may utilize examples of second training data set 411 of FIG. 4 which correspond to a given class and/or examples of sample data 651 of FIG. 6 which correct to a given class Detection module 1214 may include any suitable number of programs, algorithms, computer readable instructions, that, when executed, perform operations for detecting and/or reducing/correcting bias in one or more the machine learning model(s). The detection module 1214 may determine a difference between output pairs including one output from a base model (e.g., machine learning model 107) and one output from a class-aware machine learning model (e.g., class-aware machine learning model of FIG. 1). As a non-limiting example, a set of examples of a training data set (e.g., the second training data set 413 of FIG. 4) may be identified (e.g., through sampling of examples corresponding to a given class) and provided to a baseline machine learning model (e.g., baseline machine learning model 107 of FIG. 1) and each of a set of class-aware machine learning model (e.g., class-aware machine learning models 119 of FIG. 1). A difference may be computed between the output provided by the baseline machine learning model for each example and each of the outputs provided by the class-aware machine learning models for each example. In some embodiments, a mean (or other representative value such as an average, etc.) may be identified for the differences identified for the set of examples and corresponding to each class-aware machine learning model. A new set of examples may be identified from the baseline training data set and used in a similar manner to 1) compute differences between the output of the baseline machine learning model and each of the class-aware machine learning models and 2) a mean (or other representative value such as an average, etc.) for the differences identified for the new set of examples for each class-aware machine learning model may be identified. This process may be performed any suitable number of times and the resultant means (or other representative value such as an average, etc.) may be used to generate a confidence interval for each class-aware machine learning model.

The following represents an example of sample sets 1-N, and corresponding difference values.

Sample Set 1:

Difference 1.1=mean across class 1 examples of baseline machine learning model output and the output of class-aware machine learning model corresponding to class 1 (e.g., class-aware machine learning model 519A of FIG. 5).

Difference 1.2=mean across class 2 examples of baseline machine learning model output and the output of class-aware machine learning model corresponding to class 2 (e.g., class-aware machine learning model 519B of FIG. 5).

Difference 1.3=mean across class 3 examples of baseline machine learning model output and the output of class-aware machine learning model corresponding to class 3 (e.g., class-aware machine learning model 519C of FIG. 5).

Sample Set 2:

Difference 2.1=mean across class 1 examples of baseline machine learning model output and the output of class-aware machine learning model corresponding to class 1 (e.g., class-aware machine learning model 519A of FIG. 5).

Difference 2.2=mean across class 2 examples of baseline machine learning model output and the output of class-aware machine learning model corresponding to class 2 (e.g., class-aware machine learning model 519B of FIG. 5).

Difference 2.3=mean across class 3 examples of baseline machine learning model output and the output of class-aware machine learning model corresponding to class 3 (e.g., class-aware machine learning model 519C of FIG. 5).

Sample Set N:

Difference N.1=mean across class 1 examples of baseline machine learning model output and the output of class-aware machine learning model corresponding to class 1 (e.g., class-aware machine learning model 519A of FIG. 5).

Difference N.2=mean across class 2 examples of baseline machine learning model output and the output of class-aware machine learning model corresponding to class 2 (e.g., class-aware machine learning model 519B of FIG. 5).

Difference N.3=mean across class 3 examples of baseline machine learning model output and the output of class-aware machine learning model corresponding to class 3 (e.g., class-aware machine learning model 519C of FIG. 5).

The differences corresponding to a given class-aware machine learning model may be used to calculate a confidence interval. For example, differences 1.1-N may be used to calculate a confidence interval for class-aware machine learning model 519A, differences 2.1-N may be used to calculate a confidence interval for class-aware machine learning model 519B, and differences 3.1-N may be used to calculate a confidence interval for class-aware machine learning model 519C.

If each of the confidence intervals individually include a zero value, the detection module 1214 may be configured to determine that the baseline machine learning model lacks bias. Conversely, if any of the confidence intervals lacks a zero value, the base model may be identified as being biased. When the base model is determined to be biased, the detection module 1214 may identify, for each class-aware machine learning model for which the corresponding confidence interval lacks a zero value, one or more correlation parameters which have a highest correlation to the output (e.g., for the baseline machine learning model and/or for the corresponding class-aware machine learning model). In some embodiments, the highest correlated parameter may be selected or multiple of the highest correlated parameters may be selected. Any suitable combination of the highest correlated parameter(s) may be removed from the training data set.

The detection module 1214 may be configured to invoke additional training by the model training module 1212. For example, when the base model is determined to be biased and one or more correlated parameter(s) are removed from the training data, the detection module 1214 may store the modified training data in data store(s) 1203 or provide the modified training data to model training module 1212 directly. Detection module 1214 may execute a function call, a method call, or utilize an application programming interface, for example, to invoke the functionality of model training module 1212. This may cause the model training module 1212 to perform the functionality described above with the modified training data. The described process may be repeated any suitable number of times, until the detection module 1214 identifies (based on respective confidence intervals corresponding to the class-aware machine learning models) that the baseline machine learning model lacks bias.

Output module 1216 may include any suitable number of programs, algorithms, computer readable instructions, or similar, to control, interact, provide feedback, provide alerts, provide notifications, and/or operations in response to the detection module 1214 determining that the base model is biased or lacks bias. The output manager 1216 may include functionality to communicate with one or more user device (s) (e.g., via communication connection(s) 1130 of FIG. 11). The operation(s) may include aggregated information from modules 1210, 1212, 1214, and data store(s) 1203. In some embodiments, the output manager 1216 may be configured to generate reports and/or graphs (e.g., reports/graphs indicating output(s), difference(s), and/or confidence intervals), notify users of results, present such information (or any suitable data discussed herein) via one or more user interfaces, transmit such information (or any suitable data discussed herein) electronically (e.g., via email, text, or the like), or any suitable combination of the above. The output manager 1216 may be configured to store, retrieve, or transmit such data at any suitable time. In some embodiments, storing, retrieving, and/or transmitting such data may be according to a predetermined periodicity, a schedule (e.g., every hour, every day, etc.), a frequency, or by request (e.g., user request).

Figure 13:
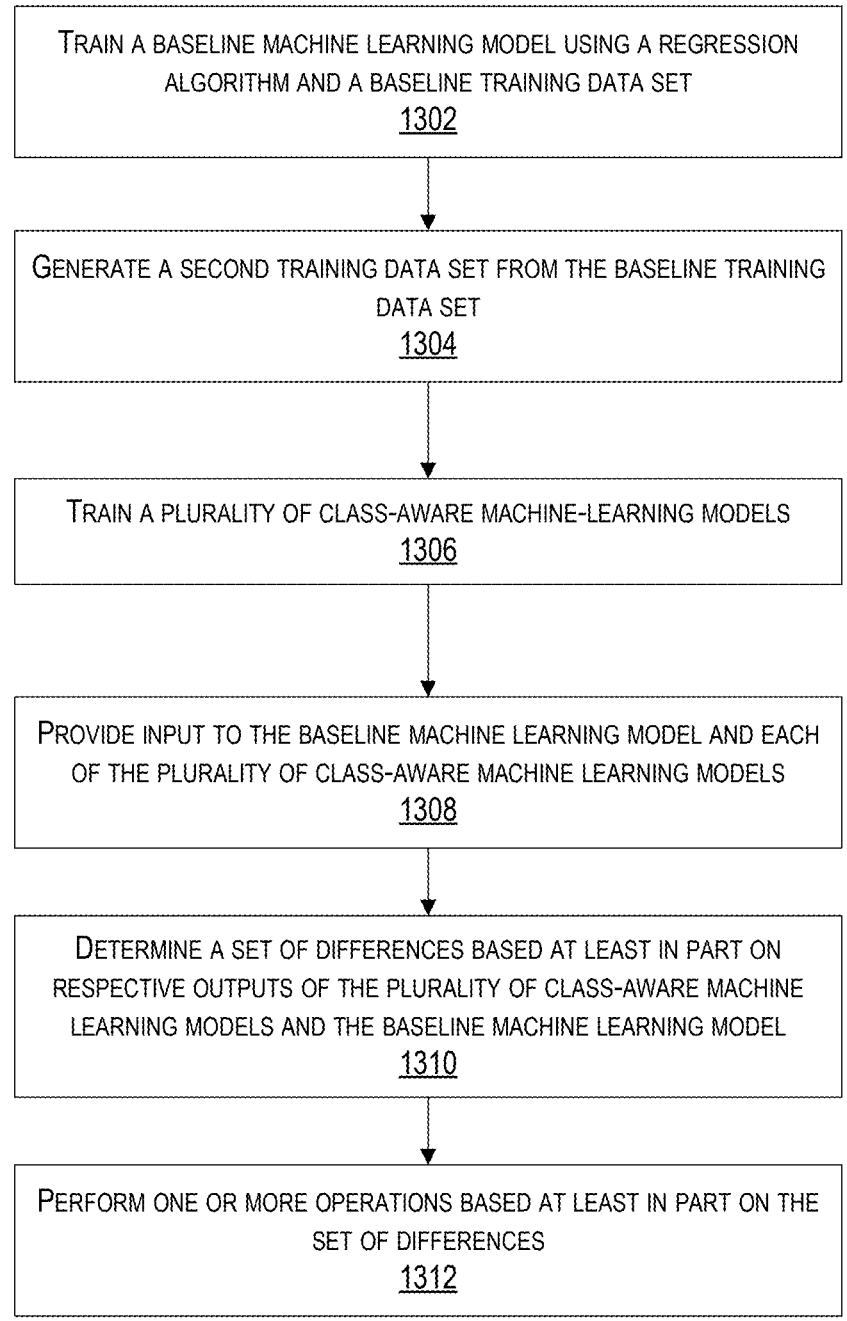
FIG. 13 is a block diagram illustrating an example method for training, in accordance with at least one embodiment.

FIG. 13 is a block diagram illustrating an example method 1300 for training, in accordance with at least one embodiment. A non-transitory computer-readable storage medium may store computer-executable instructions that, when executed by at least one processor, cause at least one computer to perform instructions comprising the operations of the method 1300. It should be appreciated that the operations of the method 1300 may be performed in any suitable order, not necessarily the order depicted in FIG. 13. Further, the method 1300 may include additional, or fewer operations than those depicted in FIG. 13. The operations of method 1300 may be performed by any suitable portion of the BDE 1200 of FIG. 12 (e.g., the BDE 102 of FIG. 1) which may be implemented by one or more computing devices such as computer(s) 1100 of FIG. 11.

The method 1300 may begin at 1302, where a baseline machine learning model (e.g., baseline machine learning model 107 with respect to FIG. 1) is trained using a regression algorithm and a baseline training data set (e.g., baseline training data set 311 with respect to FIG. 3). The baseline training data set may comprise a plurality of examples and each example of the baseline training data set may comprise one or more independent parameters and a corresponding set of dependent parameter continuous values (e.g., output value(s) 315 of FIG. 3). The baseline training data set may be pre-defined by user or machine generated.

At 1304, a second training data set (e.g., second training data set 411 of FIG. 4) may be generated from the baseline training data set (e.g., baseline training data set 311). An example of the second training data set may be associated with a class of a set of classes. The class may be determined based at least in part on executing a classification algorithm (e.g., BISG as in classification algorithm 106 of FIG. 1) on a corresponding example of the baseline training data set.

At 1306, a plurality of class-aware machine learning models (e.g., class-aware machine learning model(s) 119 of FIG. 1, class-aware machine learning model(s) 519 of FIG. 5, etc.) may be trained (e.g., using the method 200 of FIG. 2 and examples of baseline training data set 311 or second training data set 411 that correspond to a given class). The class-aware machine learning models may be unique for each class of the second set of classes. Each class-aware machine learning model being trained using a subset of examples of the second training data set where the subset of examples correspond to a respective class (e.g., class 1) of the set of classes (e.g., a set of classes including class 1, class 2, and class 3).

At 1308, an example (e.g., of the baseline training data set 311, of the second training data set 411, etc.) may be provided as input to the baseline machine learning model and each of the plurality of class-aware machine learning models. Corresponding outputs may be obtained from the baseline machine learning model and each of the plurality of class-aware machine learning models based on providing said input.

At 1310, a set of differences may be determined based at least in part on respective outputs of the plurality of class-aware machine learning models and the baseline machine learning model. One difference may be identified based on a pair of outputs comprising an output of the baseline machine learning model and an output of one of the plurality of class-aware machine learning models.

At 1312, one or more operations may be performed based at least in part on the set of differences. For example, one or more confidence intervals may be generated based on the set of differences between outputs of the machine learning model and outputs of the class-aware machine learning models (e.g., differences 1.1-N corresponding to class-aware machine learning model 519A, differences 2.1-N corresponding to class-aware machine learning model 519B, differences 3.1-N corresponding to class-aware machine learning model 519C, as discussed in connection with FIG. 12). In some embodiments, the one or more operations may be associated with verifying a lack of bias or reducing the bias of the baseline machine learning model. If each of the confidence intervals include a zero value, a lack of bias of the baseline machine learning may be verified. If all of the confidence intervals lack a zero value, the baseline machine learning model may be determined to be biased the one or more operations may include identifying and removing any suitable number of correlated parameters as described in connection with FIG. 7, repeating the operations described above. By performing the operations to remove correlated variables and perform the operations of method 1300 described above, the bias originally identified in the baseline machine learning model may be reduced.

In some embodiments, the operations may include, without limitation, generating a report/alert/notification (e.g., one that identifies and/or quantifies the bias, indicates a lack of bias, or includes any suitable combination of the data discussed herein), identifying correlated parameters (e.g., correlated parameter(s) 725), removing one or more correlated parameters from a training data set, invoking or otherwise causes new training to be performed on the baseline machine learning model and class-aware machine learning models, and the like. Depending on the context in which the model is used, the operations may include identifying that the machine learning model either lacks a bias (as defined herein) or that the bias has been corrected. The model may be made available for subsequent use based at least in part on the determination that the model lacks bias.

As a non-limiting example, a baseline machine learning model may be trained (e.g., using a regression algorithm) to determine, based on user data provided as training examples (e.g., account data such as name, address, historical transaction data, etc.), an output comprising a continuous value (e.g., a future account balance, a likelihood that a user may subsequently view data corresponding to a product, etc.). A baseline training data set (e.g., baseline training data set 111 of FIG. 1) may be used to train the model. A classification algorithm (e.g., classification algorithm 106 of FIG. 1) may be applied to the baseline training data set examples to assign a class of a set of classes (e.g., a protected class such as race, age, gender, etc., an example of which including class 1 corresponding to a person of race A, class 2 corresponding to a person of race B, and class 3 corresponding to a person of race C), the assigned classes (e.g., indicated by class indicators 442 of FIG. 4) may be combined with the corresponding examples of the baseline training data set to generate the second training data set (e.g., second training data set 413 of FIG. 4).

In some embodiments, an output of the classification algorithm may include a probability distribution that indicates a percentage of the outputs that were assigned to each of the second set of classes. One or more class-aware machine learning model(s) (e.g., the class-aware machine learning model(s) 519 of FIG. 5) may be trained from at least a portion of the second training data set (e.g., a portion that corresponds to a particular class). By way of example, class-aware machine learning model 519A of FIG. 5 may be trained using only examples that correspond to class 1/race A, class-aware machine learning model 519B of FIG. 5 may be trained using only examples that correspond to class 2/race B, and class-aware machine learning model 519C of FIG. 5 may be trained using only examples that correspond to class 3/race C. In some embodiments, the baseline training data set may be randomly sampled to identify a sample set and the examples of the sample set may be assigned a class according to the probability distribution of classes assigned by the classification algorithm. In some embodiments, these sample sets may be utilized as additional training data with which the class-aware machine learning models may be trained (e.g., using examples corresponding to the class to which the class-aware machine learning model relates).

An example (e.g., of the baseline training data set 111) may be provided as input to the baseline machine learning model and the class-aware machine learning models. Differences may be identified as described above in connection with FIG. 12 and confidence intervals corresponding to each class-aware machine learning model may be generated. The existence of bias or a lack of bias may be determined based at least in part on identifying whether each of the confidence intervals include or lack a zero value.

The various embodiments further can be implemented in a wide variety of operating environments, which in some cases can include one or more user computers, computing devices or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system can include a number of workstations running any of a variety of commercially available operating systems and other known applications for purposes such as development and database management. These devices can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may include database servers, including without limitation those commercially available from Oracle®, Microsoft®, Sybase®, and IBM®.

The environment can include a variety of data stores and other memory, and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may include one or more storage devices, such as disk drives, optical storage devices, and solid-state storage devices such as random-access memory ("RAM") or read-only memory ("ROM"), as well as removable media devices, memory cards, flash cards, etc.

Such devices can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices typically will include a number of software applications, modules, services, or other elements located within at least one working memory device, including an operating system and application programs, such as a client application or Web browser. It should be appreciated that alternate embodiments may have numerous variations from that described above. For example, customized hardware might be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Where terms are used without explicit definition as recited herein, it is understood that the ordinary meaning of the word is intended, unless a term carries a special meaning in the field of anomaly detection or other relevant fields. The terms "about" or "substantially", "similar to", "similar", "approximately" are used to indicate a deviation from the stated property or numerical value within which the deviation has little to no influence of the corresponding function, property, or attribute of the structure being described. In an illustrated example, where a dimensional parameter is described as "substantially equal" to another dimensional parameter, the term "substantially" is intended to reflect that the two dimensions being compared can be unequal within a tolerable limit, such as a fabrication tolerance. In the present disclosure, "ranges" refers to a range of values between the two stated extents and/or including one of the two stated extents.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method comprising:
    training a baseline machine learning model using a regression algorithm and a baseline training data set, wherein the baseline training data set comprises a plurality of examples, each example of the baseline training data set comprising one or more independent parameters and a corresponding set of dependent parameter continuous values;
    generating a second training data set from the baseline training data set, an example of the second training data set being associated with a class of a set of classes, the class being determined based at least in part on executing a classification algorithm on a corresponding example of the baseline training data set;
    training a plurality of class-aware machine learning models, each class-aware machine learning model being trained using a subset of examples of the second training data set, the subset of examples corresponding to a respective class of the set of classes;
    providing an example of the baseline training data set as input to the baseline machine learning model and each of the class-aware machine learning models;
    determining a set of differences based at least in part on respective outputs of the class-aware machine learning models and the baseline machine learning model;
    performing one or more operations associated with verifying a lack of bias or reducing the bias of the baseline machine learning model, the one or more operations comprising:
        identifying an amount of correlation corresponding to a parameter of the baseline training data set and an output provided by the baseline machine learning model based at least in part on a confidence interval lacking a zero value, wherein the parameter contributes to the set of differences and is correlated to a class of the set of classes;
        generating a modified training data set based at least in part on removing the parameter from the baseline training data set; and
        generating a modified machine learning model based at least in part on retraining the baseline machine learning model with the modified training data set; and
    providing data that includes a number of data fields according to a context the modified machine learning model was trained on to produce an output that is unbiased.

2. The computer-implemented method of claim 1, further comprising:
    providing an example of the baseline training data set to the classification algorithm as input data; and
    receiving output identifying a corresponding class of the set of classes for the input data.

3. The computer-implemented method of claim 1, further comprising determining a probability distribution of class assignment of the set of classes identified by executing the classification algorithm.

4. The computer-implemented method of claim 3, further comprising:
identifying a sample data set of the baseline training data set based at least in part on performing a random sampling of the baseline training data set; and
assigning a respective class from the set of classes to each example of the sample data set, the respective class being assigned based at least in part on the probability distribution.

5. The computer-implemented method of claim 4, further comprising
retraining the plurality of class-aware machine learning models based at least in part on the sample data set.

6. The computer-implemented method of claim 1, further comprising:
generating the confidence interval based at least in part on a subset of differences of the set of differences, the subset of differences corresponding to a class-aware machine learning model; and
determining that the confidence interval lacks the zero value.

7. The computer-implemented method of claim 1, further comprising:
providing, as part of a feedback procedure, the output that is unbiased of the modified machine learning model as a feedback input to one or more subsequent machine learning models.

8. A computing device, comprising:
one or more processors; and
one or more memories storing computer-executable instructions that, when executed by the one or more processors, causes the one or more processors to:
train a baseline machine learning model using a regression algorithm and a baseline training data set, wherein the baseline training data set comprises a plurality of examples, each example of the baseline training data set comprising one or more independent parameters and a corresponding set of dependent parameter continuous values;
generate a second training data set from the baseline training data set, an example of the second training data set being associated with a class of a set of classes, the class being determined based at least in part on executing a classification algorithm on a corresponding example of the baseline training data set;
train a plurality of class-aware machine learning models, each class-aware machine learning model being trained using a subset of examples of the second training data set, the subset of examples corresponding to a respective class of the set of classes;
provide an example of the baseline training data set as input to the baseline machine learning model and each of the class-aware machine learning models;
determine a set of differences based at least in part on respective outputs of the class-aware machine learning models and the baseline machine learning model;
perform one or more operations associated with verifying a lack of bias or reducing the bias of the baseline machine learning model, the one or more operations comprising:
identifying an amount of correlation corresponding to a parameter of the baseline training data set and an output provided by the baseline machine learning model based at least in part on a confidence interval lacking a zero value, wherein the parameter contributes to the set of differences and is correlated to a class of the set of classes;
generating a modified training data set based at least in part on removing the parameter from the baseline training data set; and
generating a modified machine learning model based at least in part on retraining the baseline machine learning model with the modified training data set; and
provide data that includes a number of data fields according to a context the modified machine learning model was trained on to produce an output that is unbiased.

9. The computing device of claim 8, wherein executing the one or more computer-executable instructions further causes the one or more processors to:
provide an example of the baseline training data set to the classification algorithm as input data; and
receive output identifying a corresponding class of the set of classes for the input data.

10. The computing device of claim 8, wherein executing the one or more computer-executable instructions further causes the one or more processors to determine a probability distribution of class assignment of the set of classes identified by executing the classification algorithm.

11. The computing device of claim 10, wherein executing the one or more computer-executable instructions further causes the one or more processors to:
identify a sample data set of the baseline training data set based at least in part on performing a random sampling of the baseline training data set; and
assign a respective class from the set of classes to each example of the sample data set, the respective class being assigned based at least in part on the probability distribution.

12. The computing device of claim 11, wherein executing the one or more computer-executable instructions further causes the one or more processors to retrain the plurality of class-aware machine learning models based at least in part on the sample data set.

13. The computing device of claim 8, wherein executing the one or more computer-executable instructions further causes the one or more processors to:
generate the confidence interval based at least in part on a subset of differences of the set of differences, the subset of differences corresponding to a class-aware machine learning model; and
determine that the confidence interval lacks the zero value.

14. The computing device of claim 8, wherein executing the one or more computer-executable instructions further causes the one or more processors to:
provide, as part of a feedback procedure, the output that is unbiased of the modified machine learning model as a feedback input to one or more subsequent machine learning models.

15. A non-transitory computer-readable medium storing computer-executable instructions that, when executed with one or more processors of a computing device, causes the one or more processors to:
train a baseline machine learning model using a regression algorithm and a baseline training data set, wherein the baseline training data set comprises a plurality of examples, each example of the baseline training data set comprising one or more independent parameters and a corresponding set of dependent parameter continuous values;

generate a second training data set from the baseline training data set, an example of the second training data set being associated with a class of a set of classes, the class being determined based at least in part on executing a classification algorithm on a corresponding example of the baseline training data set;

train a plurality of class-aware machine learning models, each class-aware machine learning model being trained using a subset of examples of the second training data set, the subset of examples corresponding to a respective class of the set of classes;

provide an example of the baseline training data set as input to the baseline machine learning model and each of the class-aware machine learning models;

determine a set of differences based at least in part on respective outputs of the class-aware machine learning models and the baseline machine learning model;

perform one or more operations associated with verifying a lack of bias or reducing the bias of the baseline machine learning model, the one or more operations comprising:

identifying an amount of correlation corresponding to a parameter of the baseline training data set and an output provided by the baseline machine learning model based at least in part on a confidence interval lacking a zero value, wherein the parameter contributes to the set of differences and is correlated to a class of the set of classes;

generating a modified training data set based at least in part on removing the parameter from the baseline training data set; and generating a modified machine learning model based at least in part on retraining the baseline machine learning model with the modified training data set; and provide data that includes a number of data fields according to a context the modified machine learning model was trained on to produce an output that is unbiased.

16. The non-transitory computer-readable medium of claim 15, wherein executing the one or more computer-executable instructions further causes the one or more processors to:

provide an example of the baseline training data set to the classification algorithm as input data; and receive output identifying a corresponding class of the set of classes for the input data.

17. The non-transitory computer-readable medium of claim 15, wherein executing the one or more computer-executable instructions further causes the one or more processors to:

determine a probability distribution of class assignment of the set of classes identified by executing the classification algorithm;

identify a sample data set of the baseline training data set based at least in part on performing a random sampling of the baseline training data set; and assign a respective class from the set of classes to each example of the sample data set, the respective class being assigned based at least in part on the probability distribution.

18. The non-transitory computer-readable medium of claim 17, wherein executing the one or more computer-executable instructions further causes the one or more processors to retrain the plurality of class-aware machine learning models based at least in part on the sample data set.

19. The non-transitory computer-readable medium of claim 15, wherein executing the one or more computer-executable instructions further causes the one or more processors to:

generate the confidence interval based at least in part on a subset of differences of the set of differences, the subset of differences corresponding to a class-aware machine learning model; and determine that the confidence interval lacks a zero value.

20. The non-transitory computer-readable medium of claim 15, wherein executing the one or more computer-executable instructions further causes the one or more processors to:

provide, as part of a feedback procedure, the output that is unbiased of the modified machine learning model as a feedback input to one or more subsequent machine learning models.

* * * * *